United States Patent
Mirov et al.

(10) Patent No.: US 6,836,824 B1
(45) Date of Patent: Dec. 28, 2004

(54) METHOD AND APPARATUS FOR REDUCING POWER CONSUMPTION IN A CACHE MEMORY SYSTEM

(75) Inventors: Russell N. Mirov, Los Altos, CA (US); Michel Cekleov, Mountain View, CA (US); Mark Young, Mountain View, CA (US); William M. Baldwin, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/670,368

(22) Filed: Sep. 26, 2000

(51) Int. Cl.[7] .............. G06F 12/00; G06F 3/00; G06F 1/30; G11C 8/00
(52) U.S. Cl. ................ 711/118; 711/154; 365/226; 365/228; 365/229; 710/14; 713/320; 713/323; 713/300; 713/321
(58) Field of Search ................... 711/118, 154; 365/226, 227, 228, 229; 710/14; 713/300, 320, 321, 322, 323

(56) References Cited

U.S. PATENT DOCUMENTS

| | | | |
|---|---|---|---|
| 5,220,293 A | | 6/1993 | Rogers |
| 5,719,800 A | * | 2/1998 | Mittal et al. ............. 713/321 |
| 5,724,611 A | * | 3/1998 | Evoy ......................... 710/28 |
| 5,931,951 A | * | 8/1999 | Ando ....................... 713/324 |
| 5,982,210 A | | 11/1999 | Rogers |
| 6,041,401 A | * | 3/2000 | Ramsey et al. ........... 712/43 |
| 6,105,141 A | * | 8/2000 | Hanlon .................... 713/323 |
| 6,240,152 B1 | | 5/2001 | Ho |
| 6,528,974 B1 | | 3/2003 | Mirov et al. |
| 6,608,476 B1 | | 8/2003 | Mirov et al. |

* cited by examiner

*Primary Examiner*—Kimberly McLean-Mayo
(74) *Attorney, Agent, or Firm*—Meyertons Hood Kivlin Kowert & Goetzel, P.C.; B. Noël Kivlin

(57) ABSTRACT

A method for operating a cache having a sleep mode is provided. The cache is located within a memory hierarchy of a computer system, and the method is comprised of receiving a first cache request, and servicing the first cache request. A sleep mode signal is asserted in response to completion of the servicing of the first cache request. Thereafter, a second cache request is received, and the sleep mode signal is deasserted in response to receiving the second cache request. Thereafter, the second cache request is serviced.

12 Claims, 17 Drawing Sheets

Figure 9
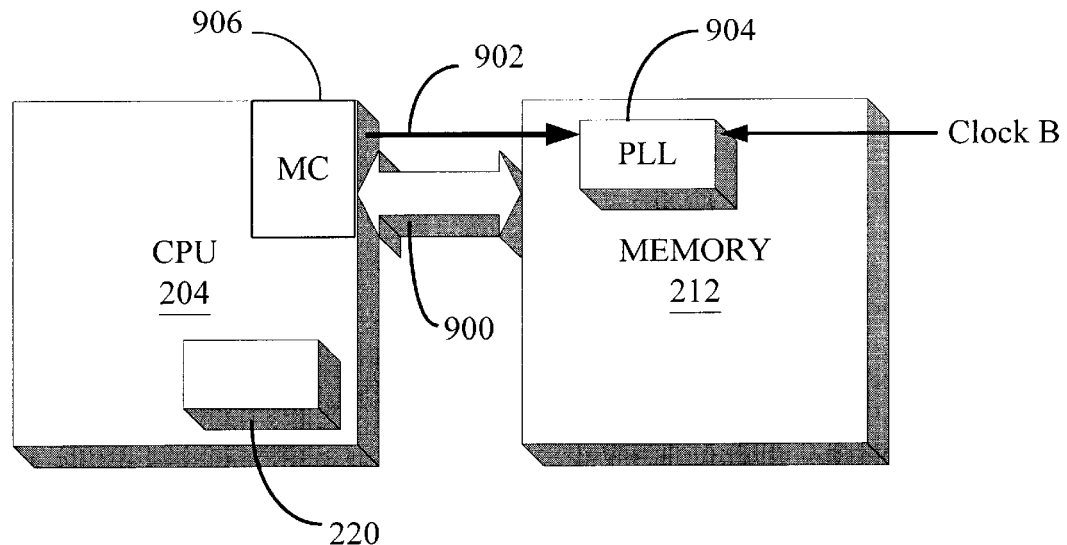
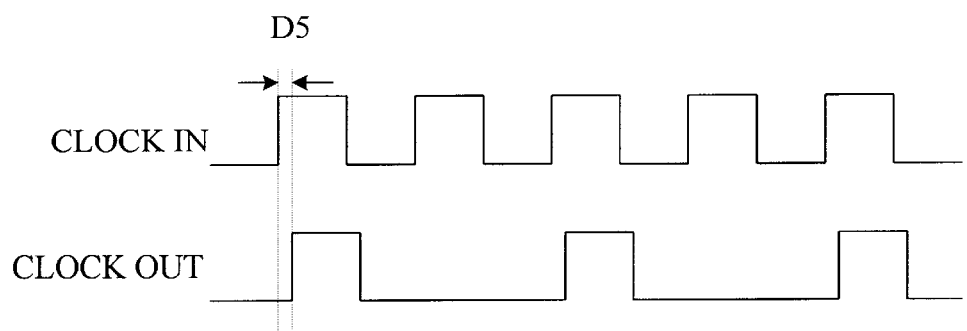
Figure 12

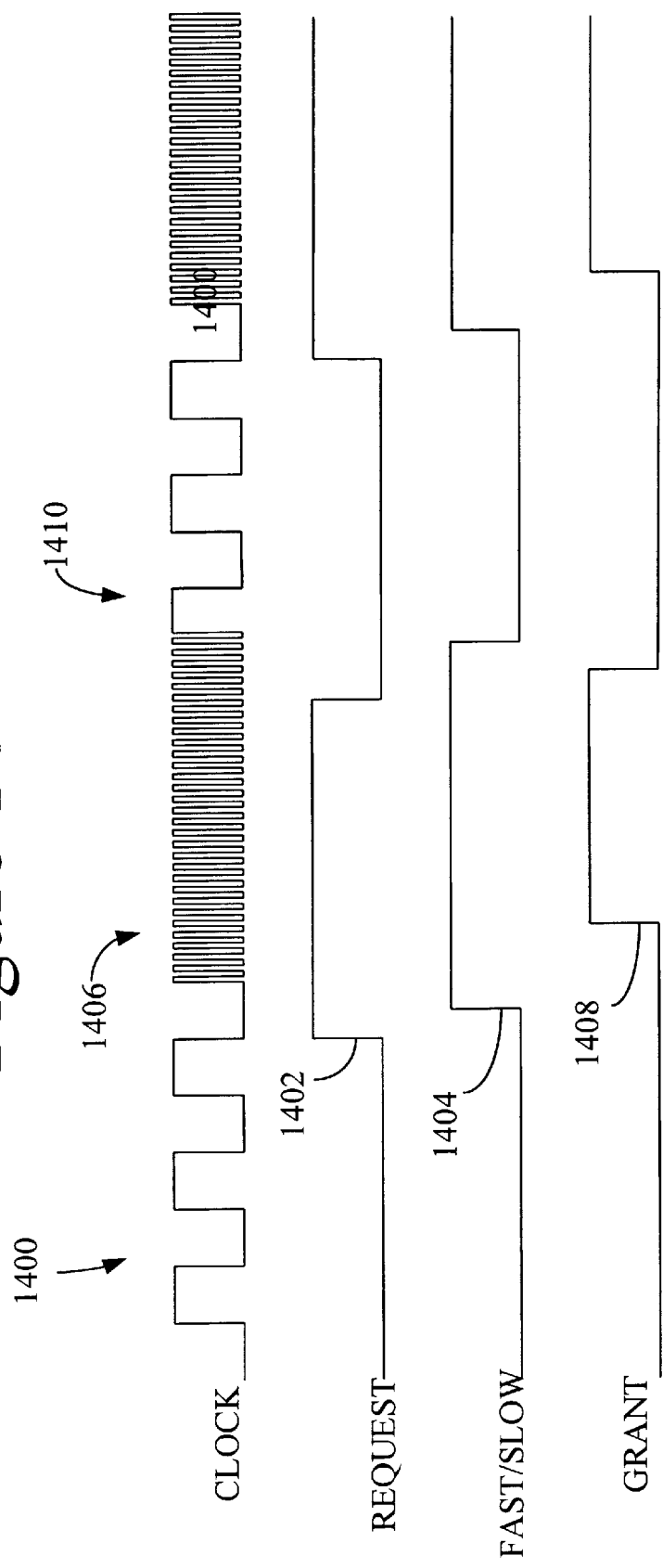

METHOD AND APPARATUS FOR REDUCING POWER CONSUMPTION IN A CACHE MEMORY SYSTEM

BACKGROUND OF THE INVENTION

1. Field of the Invention

This invention relates generally to low-power operating modes of electronic devices, and, more particularly, to a method and apparatus for transitioning between multiple power saving modes of operation.

2. Description of the Related Art

For a variety of reasons, power consumption has become an increasingly significant issue for electronic devices such as computer systems. First, the United States has promulgated a number of regulations regarding power usage or power savings. Further, since many electronic devices, such as laptop computers, draw power from a battery, reducing power consumption can result in significantly longer usage, making these electronic devices more versatile and useful. Additionally, power consumption is related to the amount of heat produced by the electronic device. Reducing power consumption reduces the amount of heat generated, and, thus, reduces the size and complexity of heat sinks, fans, and other structures used to help cool the electronic devices. Accordingly, reducing power consumption can result in reduced costs by eliminating or scaling back the cooling structures. Additionally, reduced heat dissipation generally means that electronic components may be more densely packed, leading to smaller, more compact packages. Moreover, reducing power consumption is environmentally friendly, as it reduces the use of fossil fuels and attendant pollutants.

Accordingly, the electronics industry has been driven to develop a variety of power saving schemes. Computer systems and other electronic devices frequently have a low-power mode of operation that is implemented using different techniques. These low-power modes primarily take advantage of the fact that most computer systems are not always working at high capacity, but routinely have periods of time where they are essentially idle. Some computer systems reduce power by reducing the power consumed by certain components used in the system during these idle periods of time. For example, many computer systems employ a monitor, which consumes substantial power. Thus, during low-power mode, the system may turn the monitor off. Likewise, other components, such as a hard disk drive, compact disk (CD) player, random access memory (RAM), and the like may also be turned off. Significant power savings may be achieved by removing power from the presently unused peripheral devices. However, when a user attempts to operate a computer system that has its peripheral devices powered-down, a significant delay occurs before the computer system can restore power to the peripherals and begin responding to the requests of the user. Thus, many users bypass or otherwise disable these types of low-power operating modes to avoid these delays.

Other power saving schemes reduce the frequency of a clock signal supplied to components used in the computer system. All other factors being equal, reducing the clock frequency generally proportionally reduces power consumption. Thus, some systems reduce the clock frequency by a significant factor, such as by one-half or more to achieve significant power savings. Normally, however, the various subsystems within a computer system must have a globally synchronized clock signal to insure proper operation. This synchronization is commonly achieved using a phase-locked-loop (PLL) circuit. PLL circuits, however, have a finite frequency range in which they operate with sufficient speed and accuracy to insure that a globally synchronized-clock signal may be maintained. Thus, where the clock frequency is changed dramatically, such as by half or more, the PLLs may operate marginally or erratically. Faulty operation of the PLLs may produce unstable operation of the computer system as a whole, causing the system to crash or lock-up. Thus, during transitions from normal to low-power mode, or vice versa, the system may fail, again encouraging the user to disable the power saving feature.

The present invention is directed to overcoming, or at least reducing the effects of, one or more of the problems set forth above.

SUMMARY OF THE INVENTION

In one aspect of the present invention, a method for operating a cache having a sleep mode is provided. The cache is located within a memory hierarchy of a computer system, and the method is comprised of receiving a first cache request, and servicing the first cache request. A sleep mode signal is asserted in response to completion of the servicing of the first cache request. Thereafter, a second cache request is received, and the sleep mode signal is deasserted in response to receiving the second cache request. Thereafter, the second cache request is serviced.

In another aspect of the instant invention, an apparatus is provided. The apparatus is comprised of a memory hierarchy system and a controller. The memory hierarchy system has a cache with a sleep mode. The controller is adapted to receive a plurality of cache requests and cause the cache to service the requests. The controller is configured to cause the cache to enter the sleep mode between at least a portion of the plurality of cache requests.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIG. 9 illustrates a block diagram of an interface between a memory and a CPU of the computer system of FIG. 2;

FIG. 12 illustrate a timing diagram of various signals used in the control circuit and PLL circuit of FIG. 10;

FIG. 14 illustrates a timing diagram of various signals used in controlling the system bus of FIG. 13;

Figure 1:
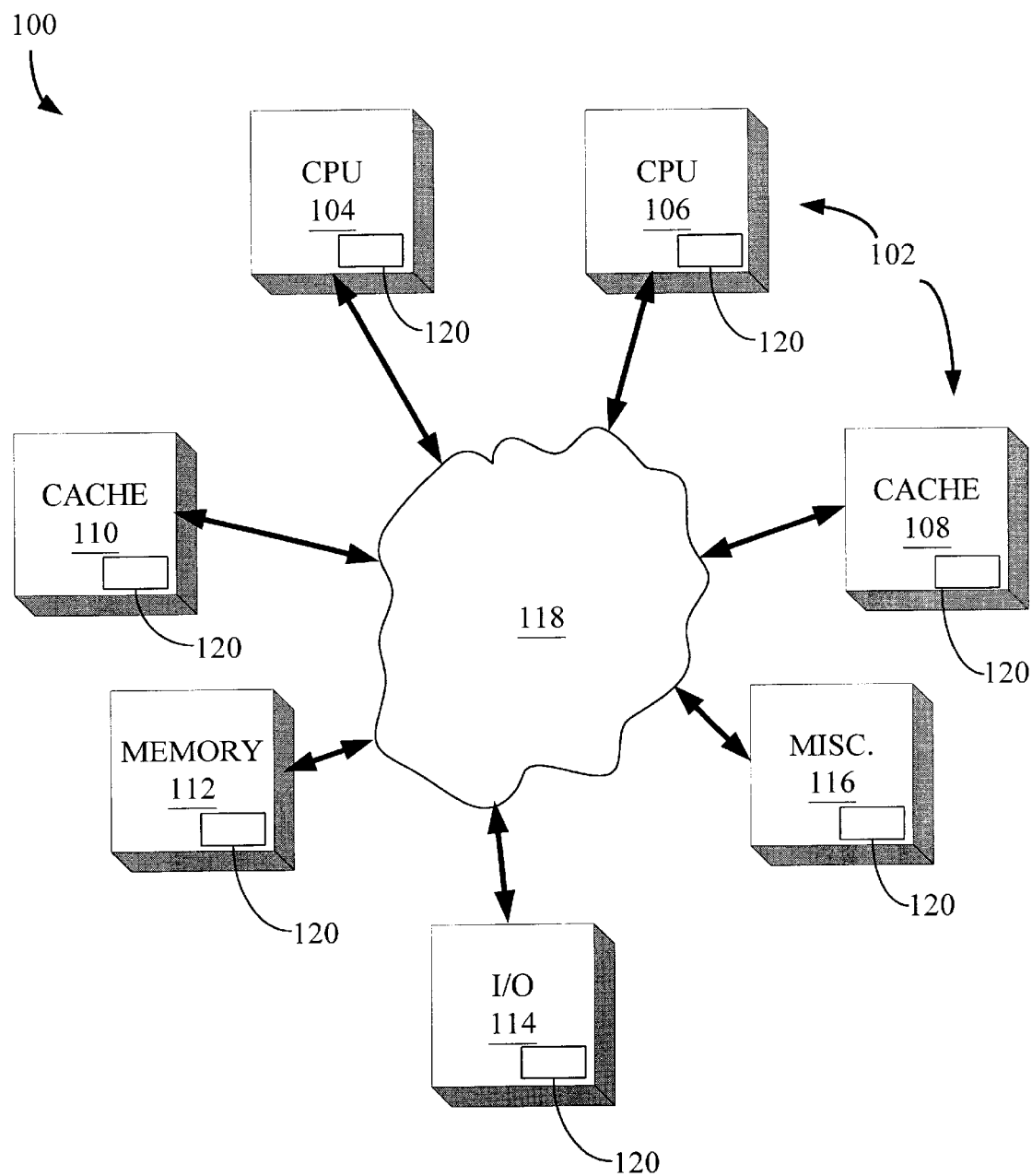
FIG. 1 illustrates a stylized representation of a computer system that may advantageously employ one or more of the aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives failing within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method and apparatus for providing a multi-level, low-power mode of operation according to the present invention are shown in FIGS. 1–21. As will be readily apparent to those skilled in the art upon a complete reading of the present application, the present method and apparatus are applicable to a variety of computer systems other than the embodiment illustrated herein, and moreover to electronic devices other than computer systems, including, but not limited to, logic devices, memory devices, and the like.

Turning now to FIG. 1, a stylized representation of a computer system 100 that may advantageously employ one or more of the aspects of the present invention is shown. Generally, the computer system 100 is comprised of exemplary components 102, such as a first and second central processing unit (CPU) 104, 106, a first and second cache 108, 110, a memory 112, input/output (I/O) 114, and other miscellaneous components 116. These components 102 are coupled together via an architecture 118, which allows the components 102 to efficiently communicate with one another and potentially with other external devices (not shown), such as other computer systems, printers, scanners, etc.

During normal operation, each of the components 102 operates at a preselected clock frequency, drawing power at a preselected rate. During this normal operation, the computer system 100 is generally fully powered and prepared to perform any task requested of it, utilizing the resources of the computer system 100, as represented by the components 102. That is, during normal operation, the components 102 are operating in a mode that corresponds to their designed full, undiminished capabilities. The components 102 may be accomplishing useful work at a rate of anywhere between being idle or working at full capacity, but are nonetheless being provided with sufficient voltage, current, and clock frequency to perform useful work at their designed full, undiminished capabilities.

Accordingly, there may be times when the computer system 100 may have its components 102 being utilized to perform useful work at a rate below that of their maximum capabilities. During these periods of underutilization, the computer system 100 may be able to perform its currently assigned tasks at a lower clock frequency and/or with less power provided thereto without adverse impact. Moreover, there may also be times when the computer system 100 is essentially idle, providing little or no useful work. During these idle periods, it may be possible to further reduce the clock frequency and/or power consumption of the computer system 100 without adverse impact.

Thus, in accordance with at least one aspect of the present invention, the computer system 100 has at least three modes of operation: a normal mode, a reduced power mode, and an idle mode. During the reduced power mode, the clock frequency applied to at least some of the components may be reduced by a significant factor, which allows the computer system 100 to remain operational, but at reduced speed, power, or capability. In one exemplary embodiment, the clock frequency is reduced by a factor of about one-half. Those skilled in the art will recognize that the factor by which the clock signal is reduced is a matter of design choice, and may vary widely from the exemplary factor of one-half without departing from the spirit and scope of the instant invention.

In the event that the full capabilities of the computer system 100 are subsequently requested, the clock frequency may be promptly restored to its full value to restore the full capabilities of the computer system 100. On the other hand, if the load on the computer system 100 drops further to, for example, substantially idle, then the idle mode may be implemented by further reducing the clock frequency applied to at least some of the components 102. This further reduction in clock frequency may further reduce the power consumed by the computer system 100, but still maintains the computer system 100 in an operational state, albeit substantially diminished. In this idle mode of operation, the computer system 100 remains active and capable of responding to requests, such as operator interaction with a keyboard, mouse or other pointing device (not shown). Additionally, some computer systems 100 may be coupled to a network (not shown) that periodically attempts to communicate with the computer system 100. The computer system 100 may be programmed or hard-wired to respond to requests of this type by returning the computer system 100 to either the reduced power mode or the normal mode by restoring the clock frequency to the appropriate level, or by electing to handle the request while remaining in the idle mode of operation.

In one embodiment, the clock frequency is reduced to about 1/32 of the normal mode frequency. However, those skilled in the art will recognize that the factor by which the clock signal is reduced is a matter of design choice, and may vary widely from the exemplary factor of 1/32 without departing from the spirit and scope of the instant invention.

A variety of factors may be considered in determining when to transition between the normal, reduced power, and idle operating modes. For example, the computer system 100 may monitor the utilization of the components 102. That is, when the utilization of the components 102 falls below a preselected level for a preselected period of time, the computer system 100 may elect to move to the reduced power or even the idle operating mode. Utilization may be measured using any of a variety of conventional techniques, such as the time since last accessed, the amount of resources being currently consumed, the average amount of resources utilized for a preselected duration of time, and the like.

The components 102 are not limited to all operating at the same clock frequency. In fact, computer systems 100 commonly have components 102 that operate at a fractional component of the clock frequency during normal operation. For example, the memory 112 often operates at a fraction of the speed that the CPUs 104, 106 operate. Semiconductor memory capable of operating at the same speed as high-speed CPUs is expensive, and thus, is not normally used to construct the relatively large memory 112, but is generally used to construct the substantially smaller cache 108, 110. Likewise, some busses used in exemplary embodiments of the architecture 118 may operate at a fractional component of the clock frequency during normal operation. Thus, the components 102 coupled to these busses may also operate at a reduced clock frequency during normal operation. In some embodiments, it may be useful to proportionally reduce the clock frequency supplied to at least some of these busses and components 102. On the other hand, it may be useful to maintain the clock frequency of select ones of the busses and components 102 when entering the reduced power or idle modes. In one aspect of the instant invention, a method and apparatus are provided to allow the clock frequency of the various busses and components 102 to be independently varied, as desired.

Thus, while the same frequency is not normally used universally throughout the computer system 100, the various clock frequencies are normally synchronized, often by a device such as a phase locked loop (PLL) circuit (see FIGS. 5–8 and the attendant description for a detailed discussion of one embodiment of a PLL used in the present invention). That is, the clock signal applied to the CPU 104 is synchronized with the clock signal applied to the I/O 114 so that low-to-high (or high-to-low) transitions in the various clock signals occur substantially simultaneously.

In the event that the various clock signals are not synchronized, signals traveling between the components 102 may become corrupted. For example, if the memory 112 is providing data to the CPU 104, it will do so for a period of time measured from a low-to-high transition of the memory clock signal. If the CPU clock signal is not synchronized precisely with the memory clock signal, then the CPU 104 may not "look for" the data provided by the memory 112 until too late, or too early. Thus, the data provided by the memory 112 may be lost or otherwise corrupted.

Accordingly, during the transitions between the normal, reduced power, and idle modes, the variations in the clock frequency should be closely coordinated among the components 102. Registers 120 located within or otherwise accessible to each of the components 102 assist, at least in part, in coordinating the variations of the clock frequency. Further, a handshaking protocol between the components 102 further aids in the coordination of the clock frequency variations.

The architecture 118 may take on any of a variety of forms without departing from the spirit and scope of the instant invention. To illustrate various aspects of the instant invention, the implementation of the invention in an exemplary architecture is shown beginning in FIG. 2. However, the instant invention admits to much wider application and should not be considered as being limited to the particular architecture 118 illustrated herein unless specifically set forth in the appended claims.

Figure 2:
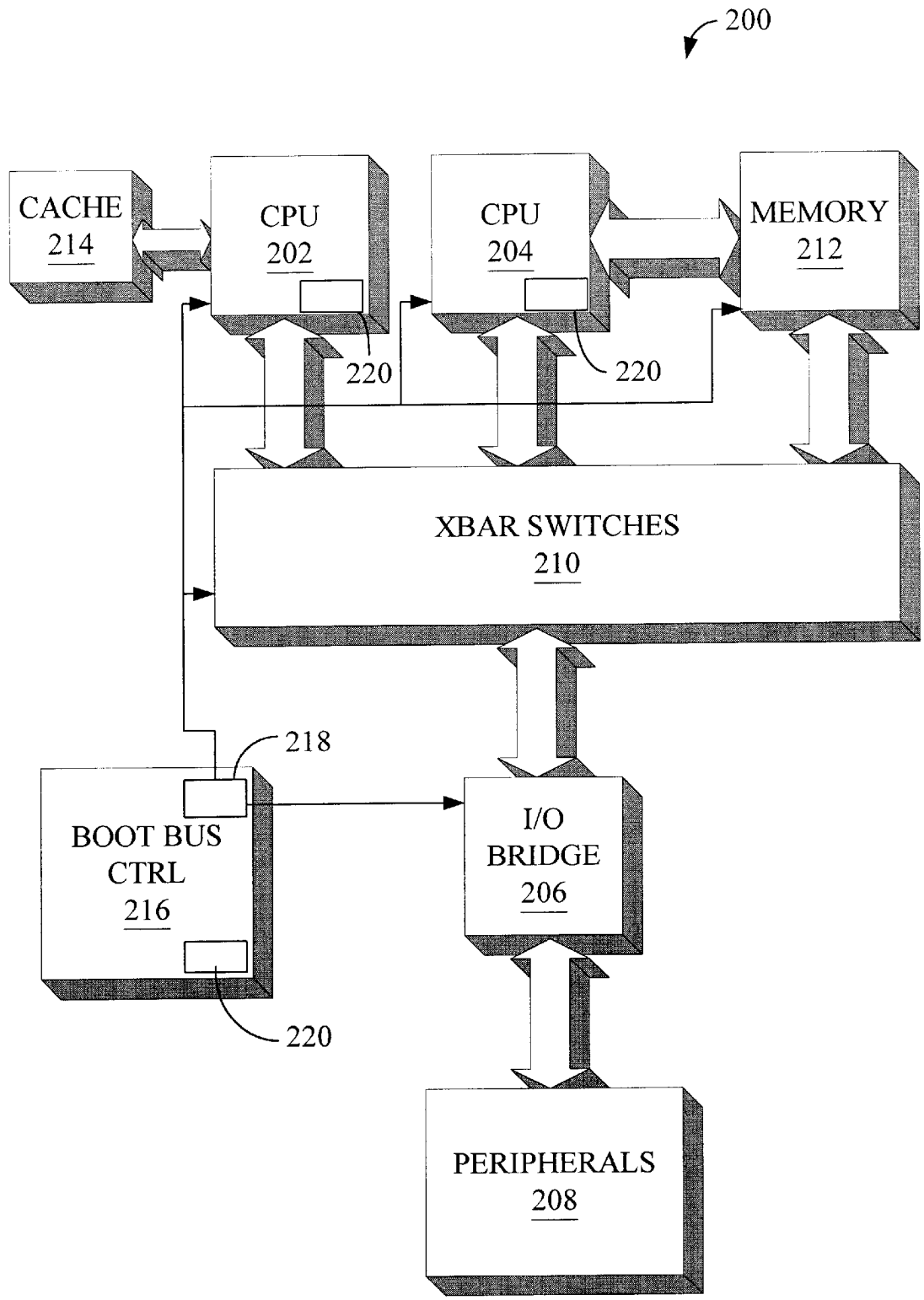
FIG. 2 schematically illustrates a top level block diagram of the computer system of FIG. 1.

FIG. 2 illustrates a top level block diagram of one embodiment of a computer system 200 that may advantageously employ one or more aspects of the present invention. The computer system 200 may comprise a pair of central processing units (CPUs) 202, 204, such as UltraSPARC™ or MicroSPARC™ microprocessors commercially available from Sun Microsystems. Those skilled in the art, having benefit of the accompanying specification, will appreciate that the present invention has application in a variety of computer systems, including single CPU systems. An input/output (I/O) bridge 206 interfaces a plurality of peripheral devices 208 with the CPUs 202, 204 through a conventional set of crossbar switches 210. The peripheral devices 208 may also communicate with memory 212 through the crossbar switches 210. Additionally, the memory 212 may be coupled directly to one or more of the CPUs 202, 204. One or more caches 214 may also be coupled to one or more of the CPUs 202, 204.

The computer system 200 includes a boot bus controller (BBC) 216, which provides a plurality of functions, including generating and distributing control signals to each of the components 202–214. Additionally, the BBC 216 includes an energy or power controller 218 that coordinates varying the clock frequency during transitions between the normal, reduced power, and idle operating modes.

Figure 3:
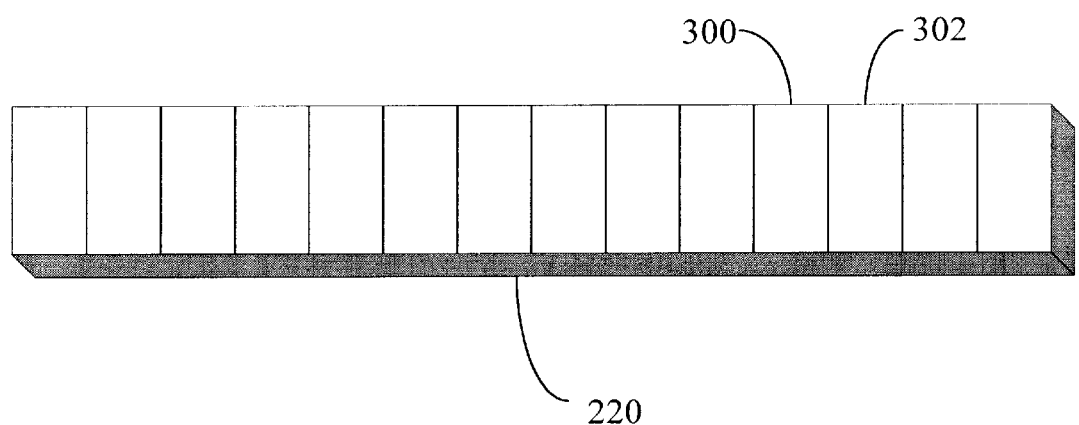
FIG. 3 schematically illustrates a register employed in various components of the computer system of FIG. 1.

Finally, each of the components 201–214 has associated with it a register 220 that assists in coordinating variations in the clock frequency during transitions between the normal, reduced power, and idle operating modes. Turning to FIG. 3, one exemplary embodiment of the register 220 is illustrated. The register 220 has a plurality of bits, two of which 300, 302 are used to identify the clock frequency or operating mode to which the associated component 202 will be switched. In one embodiment, the bits 300, 302 identify the operating mode or clock frequencies as set forth in Table I below.

TABLE I

| Register Bits | Operating Mode |
| --- | --- |
| 00 | Normal mode |
| 01 | Reduced power mode |
| 10 | Idle mode |
| 11 | Reserved |

The register bits 300, 302 are set to the desired value by the power controller 218 of the BBC 216. That is, prior to switching between the various operating modes, software operating on the computer system 200 performs a write operation into each of the registers 220 to set the values of the bits 300, 302 to the desired level in anticipation of an upcoming switch in operating modes. For example, assume that the computer system 200 is presently operating in the normal mode but that a relatively low load is currently being placed on the computer system 200, such that the computer system 200 may be switched to the reduced power operating mode. Software, which is executed by one or both of the CPUs 202, 204 writes the binary value 01 into the register 220 at the bits 300, 302 to indicate that the component 202 should switch to the reduced power operating mode during the next transition.

In the illustrated embodiment, the power controller 218 includes both hardware and software. At least a portion of the hardware may be located in the BBC 216, and the CPUs 204, 206 may be programmed to execute software to implement some or all of the functions described herein. However, as will be appreciated by those of ordinary skill in the art, hardware circuits designed to implement the particular functions may also be used. Moreover, the functions of the controller 218 described herein may be performed by one or more processing units that may or may not be geographically dispersed. Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the actions and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 4:
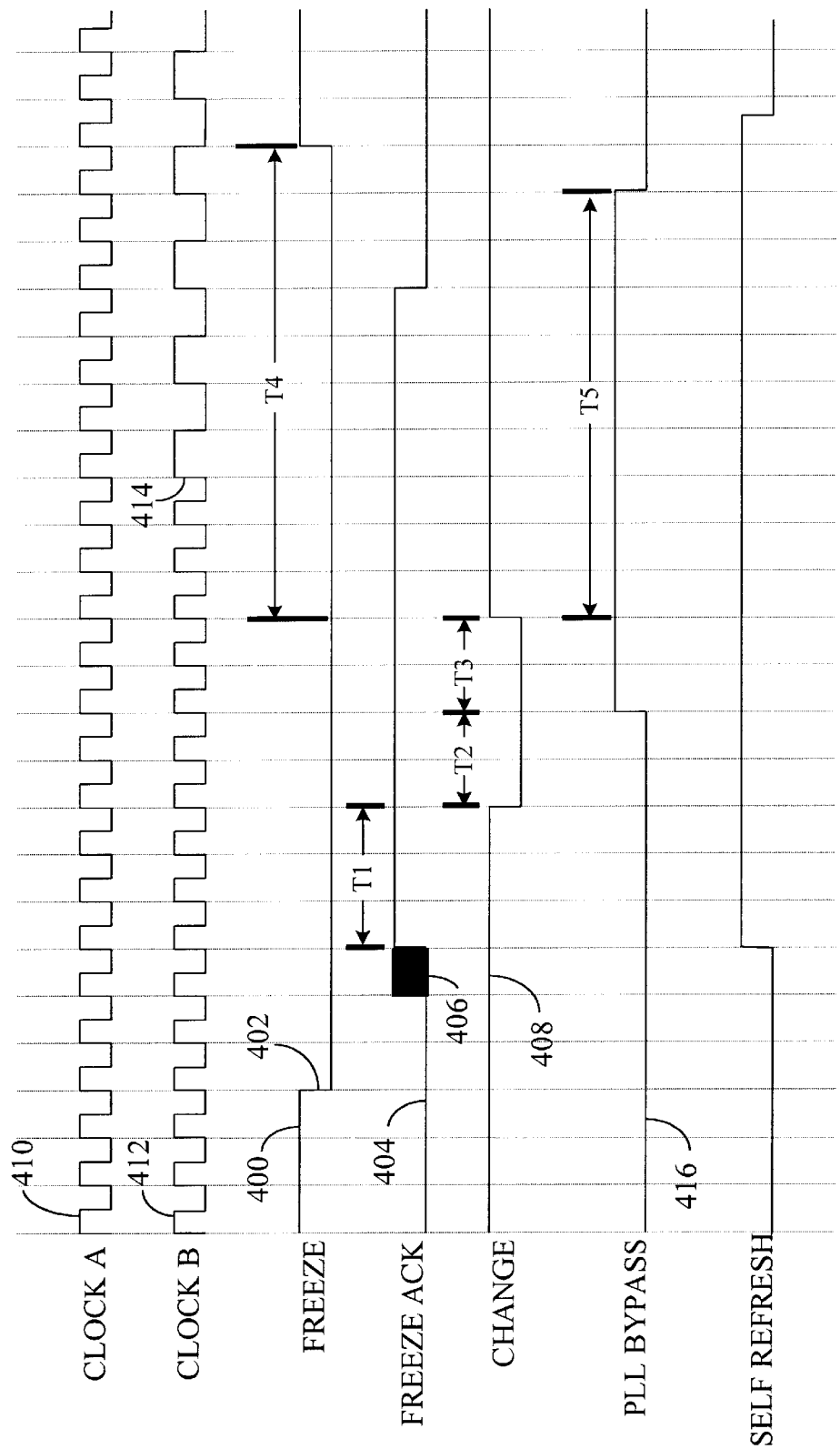
FIG. 4 illustrates a timing diagram for various handshaking signals used by the computer system of FIGS. 1 and 2 to cause the various components of the computer system to switch between various power saving modes of operation.

Transitions between the various operating modes of the computer system 200 are coordinated by a handshaking protocol, as generally set forth in the timing diagrams of FIG. 4. After the registers 220 have been properly configured, the power controller 218 initiates a transition between operating modes by asserting a Freeze signal 400. In the illustrated embodiment, the Freeze signal 400 is illustrated as being asserted by a transition 402 to a logically low value. Those skilled in the art, however, will appreciate that the Freeze signal 400 (and any other signal discussed herein) could readily be designated as being asserted by a transition to a logically high value without departing from the spirit and scope of the instant invention.

The components 202 receive the Freeze signal 400 and respond by beginning the process of suspending all transactions between the components 202, such as bus transactions. As each of the components 202 completes the suspension process, it delivers a Freeze Acknowledge signal 404 to the power controller 218. Since the components 202 may be operating at different frequencies and may be in the process of transferring varying size packets of data therebetween, varying amounts of time may be needed by the components 202 to complete the process of suspending all of their pending transactions. Thus, the power controller 218 waits for an undefined period of time, indicated by a block 406, for all of the components 202 to respond with a Freeze Acknowledge signal 404. That is, the power controller 218 takes no further action, with respect to changing the clock frequencies of the components 202, until the Freeze Acknowledge signal 404 is received from each of the components 202. It should be understood that the instant invention does not require all transactions to be completed, but rather, that they be halted, at least temporarily, until the change in clock frequency can be completed. Thereafter, any pending transactions may be resumed.

A predetermined delay, T1, after all of the Freeze Acknowledge signals 404 have been received, the power controller 218 asserts a Change signal 408, which is active low. The components 202 receive the change signal and move to the new clock frequency indicated by the bits 300, 302 in the register 220 after a preselected number of clock cycles. A Clock A signal 410 is intended to be representative of a clock signal produced by the power controller 218 and delivered to one or more of the components 202. A Clock B signal 412 is intended to be representative of a clock signal generated by or for one or more of the components 102 based on the content of the bits 300, 302 in the register 220. Generally, the components 202 use the Clock B signal to control the timing of their internal operation. Thus, as can be seen in the exemplary timing diagrams of FIG. 4, the Clock B signal 412 changes frequency on the third clock cycle 414 following deassertion of the Change signal 408. In the exemplary embodiment, all of the components 202 change their frequency according to the bits 300, 302 substantially simultaneously.

After the Change signal 408 is deasserted, the power controller 218 waits a predetermined time period to allow the Clock B signal 412 to stabilize, and then releases the Freeze signal 400. Once the Freeze signal 400 is released or deasserted, transactions between the components 202 are allowed to resume. At some point, the Freeze Acknowledge signals 404 are released or deasserted by the components 202. The timing is not critical, but needs to be done after the Change signal 408 is deasserted, and in anticipation of a subsequent transition in the frequency of the Clock B signals 412.

A PLL Bypass signal 416 is also illustrated in FIG. 4. The PLL Bypass signal 416 is used in conjunction with operation of the memory 212 during transitions between the various operating modes. A detailed discussion of the PLL Bypass signal 416 and the memory 212 is set forth subsequently herein in conjunction with FIGS. 9–12.

It should be appreciated that a variety of different power saving levels may be achieved by reducing the frequency of the Clock B signal used by selective ones of the components 202. For example, during the operation of the computer system 200, select components 202 may be used at a relatively high rate, while other components 202 may remain idle or substantially underutilized. The power controller 218 may selectively reduce the clock frequency of the idle or underutilized components 202 while maintaining the clock frequency of those components currently being used by the computer system 200.

Figure 5:
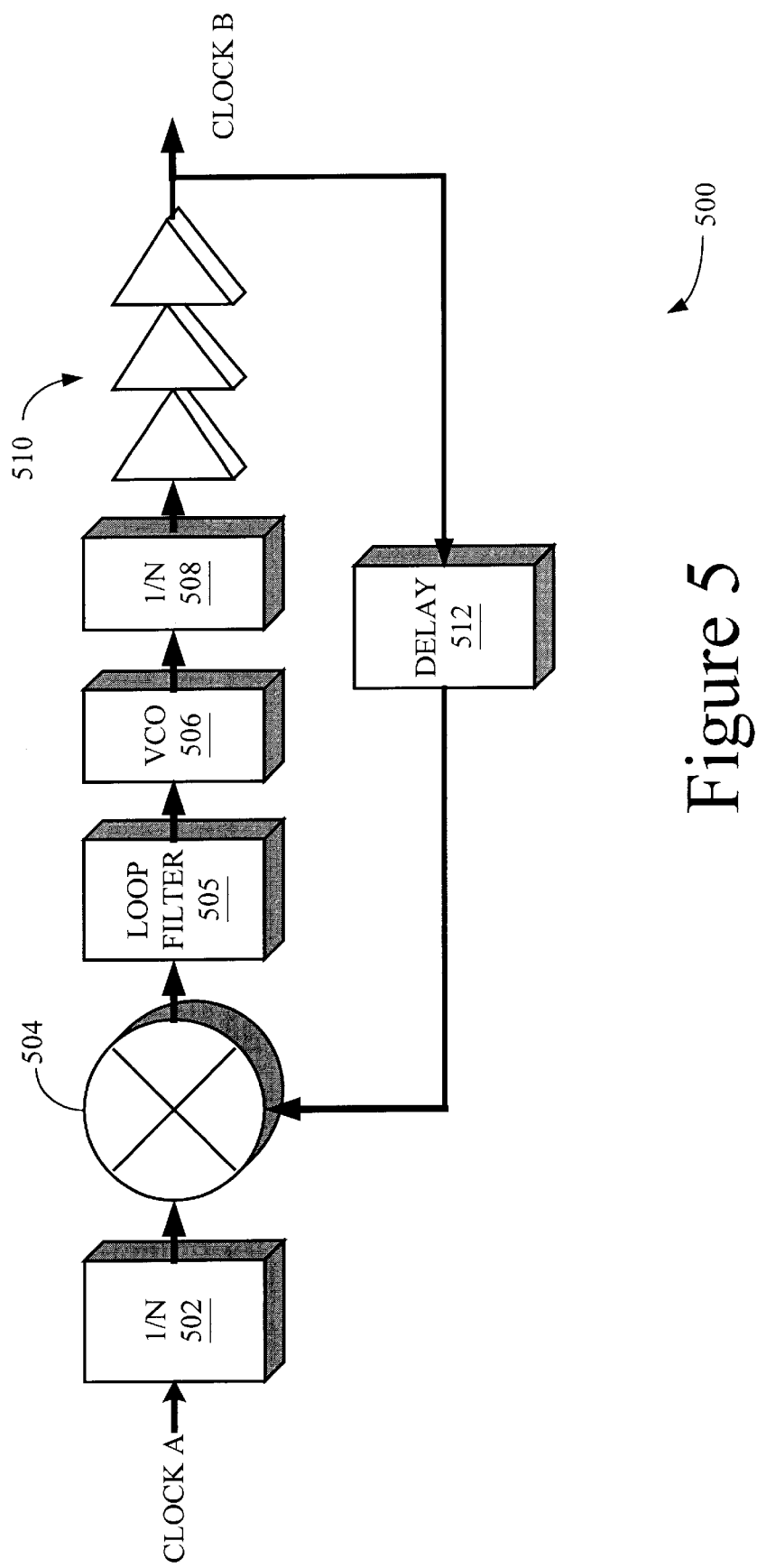
FIG. 5 illustrates a block diagram of a phased lock loop (PLL) controller in accordance with one aspect of the present invention.

Turning now to FIG. 5, a block diagram of a phased lock loop (PLL) controller 500 in accordance with one aspect of the present invention is illustrated. A plurality of the PLL controllers 500 may be associated with the components 202. That is, each of the components 202 may have one or more of the PLL controllers 500 located therein or associated therewith so as to provide the Clock B signal 412 discussed above. Generally, the PLL controller 500 has a first divide-by-N counter 502 that receives the Clock A signal 410 and produces a desired, reduced-frequency clock signal, which is delivered to an input terminal of a conventional phase comparator 504. An output terminal of the phase comparator 504 is coupled to a conventional voltage controlled oscillator (VCO) 506 through a loop filter 505. A second divide-by-N counter 508 is coupled to an output terminal of the VCO 506. An output terminal of the second divide-by-N counter 508 is coupled to a conventional clock tree 510, which may produces a plurality of clock signals, including the Clock B signal 412. The Clock B signal is coupled through a delay circuit 512 to a second input of the phase comparator 504.

For purposes of describing the operation of the PLL controller 500, assume that the computer system 200 is in its normal operating mode, and that the Clock A signal 410 is at a preselected frequency, which for purposes of this description will be assumed to be about 500 MHz. Since the computer system is in the normal operating mode, the Clock B signal 412 will be at the same frequency as the Clock A signal and is synchronized with the Clock A signal 410. Accordingly, the divide-by-N counters 502, 508 have been instructed by the contents of the register 220 to produce the normal frequency, e.g., 500 MHz, as the Clock B signal 412. That is, the divide-by-N counter 502 passes the Clock A signal 410 principally unchanged, with the exception of a short delay D1, as illustrated in FIG. 6A.

The VCO 506 is currently delivering an output signal that is at the same frequency as the Clock A signal (i.e., 500 MHz in this example). The second divide-by-N counter 508, like the first divide-by-N counter 502 passes the VCO signal principally unchanged, with the exception of a short delay. The clock tree 510 receives the delayed VCO signal and produces the Clock B signal 412. A feedback path through the delay circuit 512 delivers the Clock B signal to the second input of the phase comparator 504. Any difference between the phases of the delayed Clock B signal 412 and the delayed Clock A signal 410 causes the phase comparator to deliver an output signal that varies the phase of the VCO 506. This process continues until the Clock B signal 412 is synchronized with the Clock A signal 410.

Figure 6A:
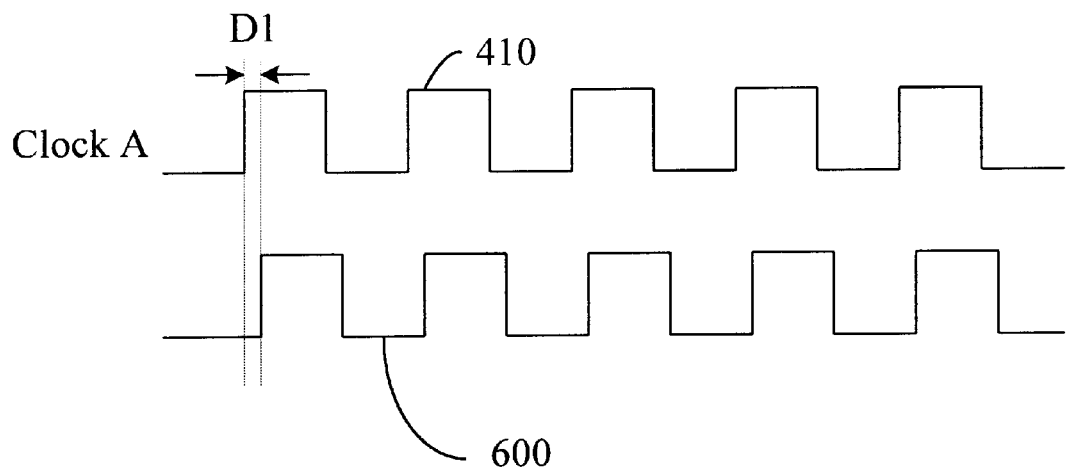
FIGS. 6A and 6B illustrate timing diagrams of various signals used in the PLL controller of FIG. 5.

The delay circuit 512 introduces a delay into the clock B signal 412 that is intended to substantially match the delay D1 introduced by the first divide-by-N counter 502, as shown in FIG. 6A. Thus, the phase comparator 504 compares the delayed versions of the Clock A and Clock B signals 410, 412, synchronizing the delayed Clock B signal with the delayed Clock A signal 600, which will also synchronize the Clock B signal 412 with the Clock A signal 410 if the delay circuit 512 matches the delay D1.

Figure 6B:
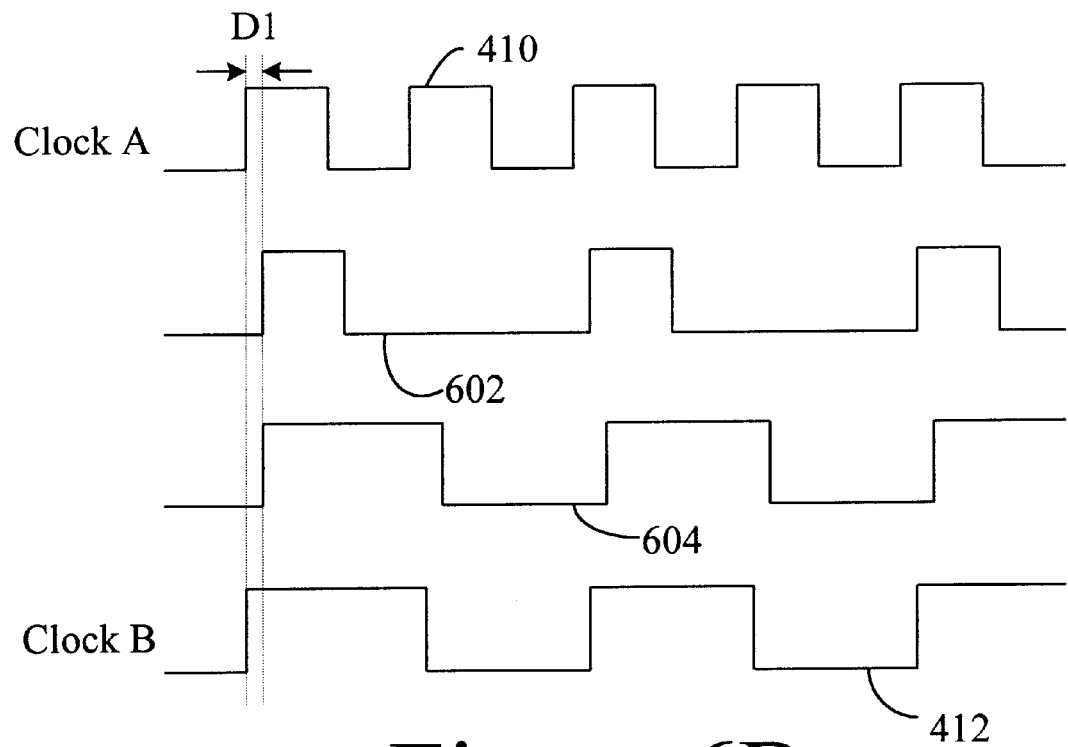

Assuming now that the computer system 200 has entered the reduced power mode, the divide-by-N counters 502, 508 have been instructed by the contents of the register 220 to reduce the frequency of the Clock B signal 412 by, for example, a factor of 2 (i.e., about 250 Mhz in this example). As shown in FIG. 6B, the divide-by-N counter 502 produces a reduced frequency clock signal 602 by eliminating every other clock pulse in the Clock A signal 410. The delay D1 introduced by the first divide-by-N counter 502 remains substantially the same as during normal operation, as illustrated in FIG. 6A. At substantially the same time, the second divide-by-N counter 508 also produces a reduced frequency clock signal similar to the reduced frequency clock signal 602 by eliminating every other clock pulse in the clock signal produced by the VCO 506. The clock tree 510 uses the reduced frequency signal from the divide-by-N counter 508 to produce the Clock B signal 412. A delayed version 604 of the Clock B signal 412 is produced by the delay circuit 512.

The delayed Clock B signal 604 is delivered to the phase comparator 504 where it is compared with the delayed Clock A signal 602. Differences between the phases of the delayed Clock A and Clock B signals 602, 604 cause the VCO 506 to vary slightly to synchronize the delayed Clock B signal 602 with the delayed Clock A signal 604. The delayed Clock A and Clock B signals 602, 604 are now synchronized with the Clock B signal being at the reduced frequency (i.e., 250 MHz in this example). The VCO 506, however, continues to operate at the normal frequency (i.e., 500 MHz in this example). That is, the VCO 506 is not forced to make wide variations in its output signal frequency, but rather, substantially remains at the normal frequency throughout any changes between the various operating modes. The relatively constant frequency of the VCO 506 contributes to the stable operation of the PLL 500 and allows the Clock B signal 412 to be quickly synchronized with the Clock A signal 410 even with large variations in the frequency of the Clock B signal 412.

Operation of the computer system 200 in the idle mode is substantially similar to operation in the reduced power mode. In the idle mode, the divide-by-N counters 502, 508 have been instructed by the contents of the register 220 to reduce the frequency of the Clock B signal 412 by, for example, a factor of 32 (i.e., about 15.625 Mhz in this example). The divide-by-N counter 502 produces a reduced frequency clock signal by passing one and eliminating thirty-one clock pulses in-the Clock A signal 410. The delay D1 introduced by the first divide-by-N counter 502 remains substantially the same as during normal and reduced power modes of operation. At substantially the same time, the second divide-by-N counter 508 also produces a reduced frequency clock signal similar to the reduced frequency clock signal by passing one and eliminating thirty-one clock pulses in the clock signal produced by the VCO 506. The clock tree 510 uses the reduced frequency signal from the divide-by-N counter. 508 to produce the Clock B signal. The delay circuit 512 produces a delayed version of the Clock B signal.

Once again, the phase comparator 504 compares the phases of the delayed Clock A and Clock B signals, and uses any difference to cause the VCO 506 to vary slightly to synchronize the delayed Clock B signal with the delayed Clock A signal. The delayed Clock A and Clock B signals are now synchronized with the Clock B signal being at the reduced frequency (i.e., 15.625 MHz in this example). The VCO 506, however, continues to operate at the normal frequency (i.e., 500 MHz in this example). That is, the VCO 506 is not forced to make wide variations in its output signal frequency, but rather, substantially remains at the normal frequency throughout any changes between the various operating modes.

Figure 7:
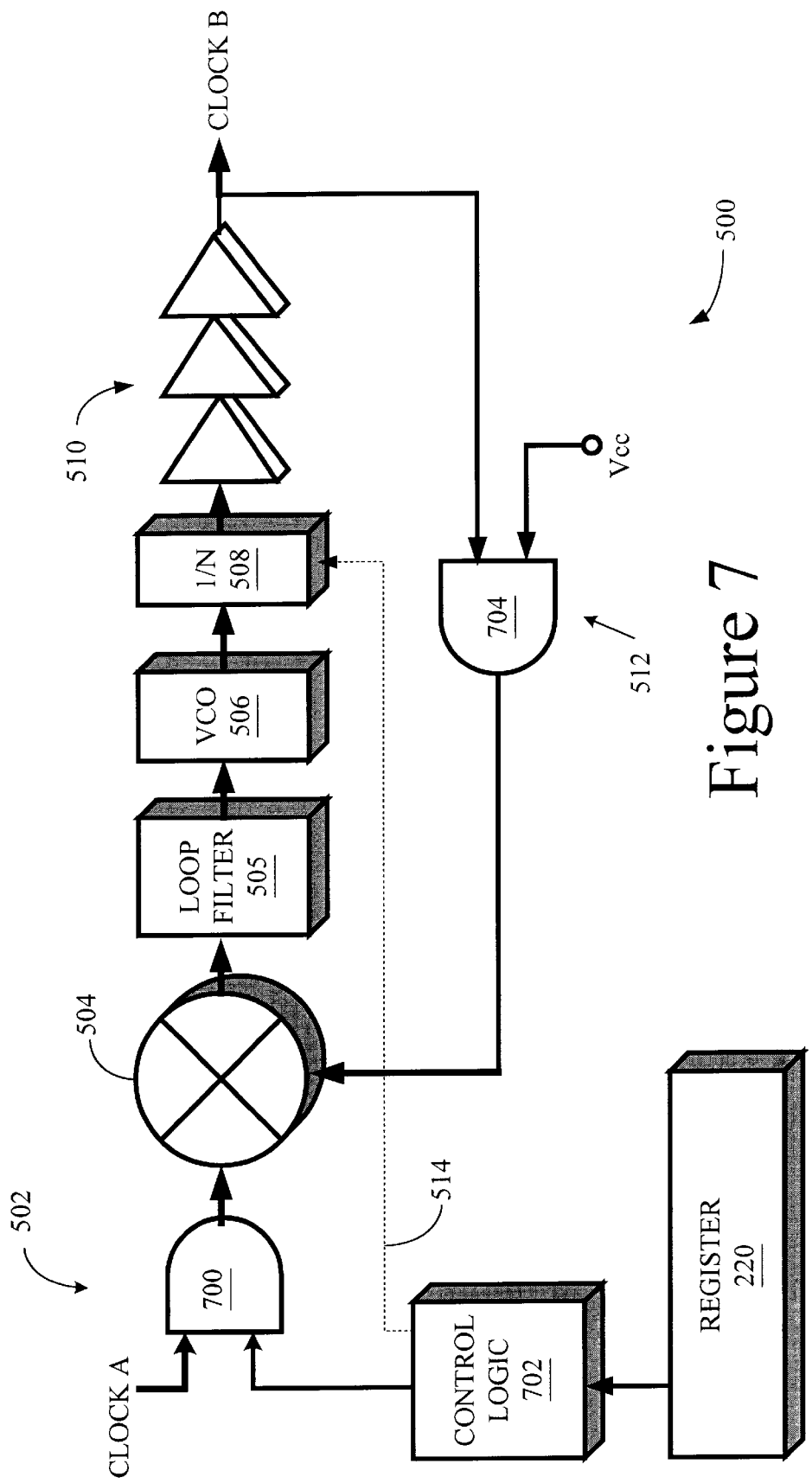
FIG. 7 illustrates a block diagram of one embodiment of the PLL controller of FIG. 5.

FIG. 7 illustrates an embodiment of the PLL controller 500 of FIG. 5. In this embodiment, the divide-by-N counter 502 is comprised of an AND gate 700 and a control logic circuit 702. The AND gate 700 has a first and second input, with the first input being adapted to receive the Clock A signal 410 and the second input being adapted to receive a control signal from the control logic circuit 702. Generally, the control logic circuit 702 produces logically high and low signals to allow the AND gate 700 to respectively pass and block the Clock A signal 410 from being delivered to the phase comparator 504. In this manner, the frequency of the Clock A signal 410 may be passed unaltered or reduced in frequency by selectively removing clock pulses. For example, if the computer system is operating in the normal mode, as indicated by the contents of the register 220, the control logic circuit 702 delivers a persistent logically high signal, which passes all clock pulses of the Clock A signal 410.

Figure 8A:
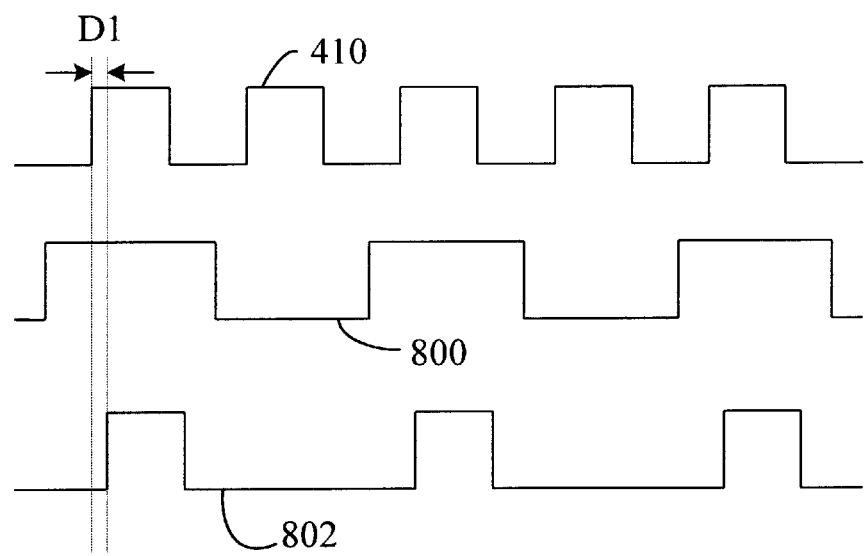
FIGS. 8A and 8B illustrate a timing diagram of various signals used in the PLL controller of FIG. 7.

Assuming now that the computer system 200 has entered the reduced power mode of operation, the control logic circuit 702, based on the contents of the register 220, "knows" that the frequency of the Clock A signal should be reduced by a factor of two. Thus, as shown in FIG. 8A, the control logic circuit 702 delivers a control signal 800 that is logically high during every other clock pulse of the Clock A signal 410. Thus, the AND gate 700 is enabled to pass every other pulse of the Clock A signal, reducing its frequency in half, and producing a reduced clock frequency signal 802.

It should be appreciated that the divide-by-N counter 508 may be configured substantially similar to the divide-by-N counter 502, and care must be taken to ensure that both of the divide-by-N counters 502, 508 transition from one operating mode to another at substantially the same time. The contents of the register 220 need to be communicated to the divide-by-N counter 508 to ensure that the divisors used by both of the divide-by-N counters 502, 508 match, as indicated by the dotted arrow 514. However, while the clock signals used to control the register 220 are synchronized with the Clock A and Clock B signals, the divide-by-N counter 508 is directly clocked by the output of the VCO 506. The output signal from the VCO 506 is out of phase with the Clock A and Clock B signals by a factor substantially corresponding to the delay introduced by the clock tree 510. This difference in timing can cause timing problems with the delivery of the contents of the register 220 to the divide-by-N counter 508. Thus, signals from the register 220 are passed through a series of stages in a buffer that are clocked with progressively more delayed versions of the Clock B signal. That is, the stages of the buffer are clocked with progressively less delayed clock signals taken from taps in the clock tree 510.

Figure 8B:
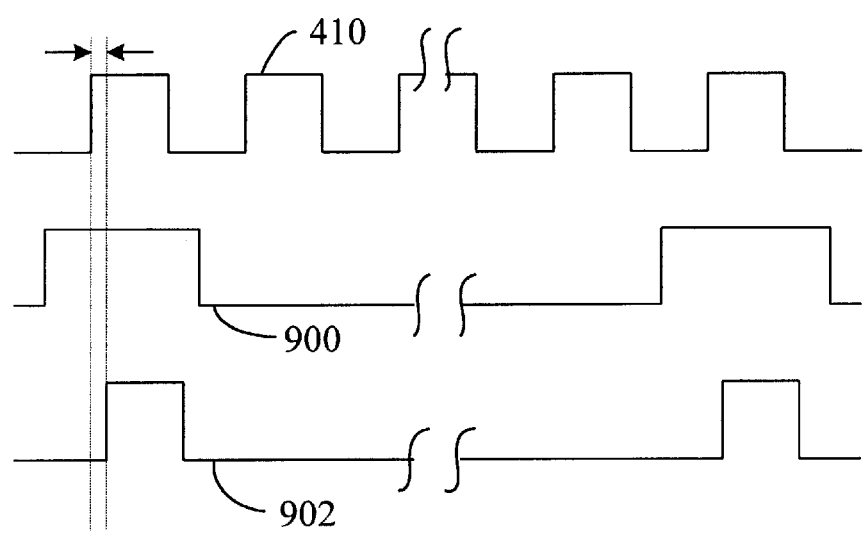

Assuming now that the computer system 200 has entered the idle mode of operation, the control logic circuit 702, based on the contents of the register 220, "knows" that the frequency of the Clock A signal should be reduced by a factor of thirty-two. Thus, as shown in FIG. 8B, the control logic circuit 702 delivers a control signal 900 that is logically high during one clock pulse and then logically low for the next thirty-one clock pulses of the Clock A signal 410. Thus, the AND gate 700 is enabled to pass every thirty-second pulse of the Clock A signal, reducing its frequency by a factor of 32, and producing a reduced clock frequency signal 902.

As shown in FIGS. 8A and 8B, the reduced frequency clock signals 802, 902 are delayed by the factor D1. The delay, D1, in this embodiment is a result of the processing time of the AND gate 700. The processing time of the AND gate 700 remains relatively constant independent of the mode of operation. As discussed above, the Clock B signal 412 is more accurately synchronized with the Clock A signal 410 by introducing the delay circuit 512 in the feedback path, where the delay circuit 512 introduces a delay substantially similar to the delay, D1. In the illustrated embodiment, the delay circuit 512 takes the form of an AND gate 704 that has a first input coupled to the Clock B signal 412 and a second input tied to a logically high signal, such as system voltage, Vcc. By constructing the AND gates 700 on the same die, using the same processes, and using transistors of similar size and configuration, the delays introduced by the AND gates 700, 704 may be substantially matched.

Turning again to FIG. 7, those skilled in the art will appreciate that the second divide-by-N counter 508 may be of a similar or identical design to that disclosed with respect to the first divide-by-N counter 502. A variety of other designs for the divide-by-N counters 502, 508 may be employed without departing from the spirit and scope of the instant invention. Accordingly, the instant invention should not be limited to the particular embodiments of the divide-by-N counters 502, 508 illustrated in FIG. 7 unless specifically set forth in the appended claims.

Not all of the components 202 may include the PLL controller 500, but rather, may employ other or additional methods and apparatus to reduce the likelihood of misoperation during transitions between the various operating modes. For example, the memory 212 of the computer system 200 employs a different strategy to allow it to lock onto the reduced frequency signal employed in the reduced power mode. As shown in FIG. 9, the memory 212 is coupled to the CPU 204 by a bus 900 and control signal lines 902, which includes a VCO_SELECT control signal. The VCO_SELECT control signal is delivered to a PLL 904 in the memory 212, and is used to aid the PLL 904 in synchronizing with the Clock B signal delivered by the BBC 216.

In one embodiment, the PLL 904 takes the form of a low voltage PLL clock driver commercially available from Motorola, Inc. as part number MPC953. As shown in the block diagram of FIG. 10, the PLL 904 receives a Clock In signal, which passes through a phase comparator 1000 and low pass filter (LPF) 1002 to a control input of a VCO 1004. An output terminal of the VCO 1004 is coupled to a first input terminal of a multiplexer 1006 and through a divide-by-two counter 1008 to a second input terminal of the multiplexer 1006. The VCO_SELECT signal is delivered to a control input terminal of the multiplexer 1006. An output terminal of the multiplexer 1006 is coupled through a second multiplexer 1010 to a clock tree 1012. The clock tree 1012 delivers a Clock Out signal to the memory 212, such as synchronous dynamic random access memory (SDRAM), for controlling its operation. The Clock Out signal is also delivered through a feedback path to an input terminal of the phase comparator 1000.

Thus, in a first mode of operation, the VCO_SELECT signal causes the multiplexer 1006 to pass the signal produced by the VCO 1004 substantially unchanged. In a second mode of operation, however, the VCO_SELECT signal causes the multiplexer 1006 to pass a signal having one-half the frequency of that produced by the VCO 1004. In the first mode of operation, the PLL 904 is capable of locking onto-a signal having a frequency falling in a first range. In the second mode of operation, the PLL 904 is capable of locking onto a signal having a frequency falling with a second range. For example, in the first mode of operation, the PLL 904 is capable of reliably locking onto a Clock In signal in the range of at least about 150 to 62.5 MHz. In the second mode of operation, the PLL 904 is capable of reliably locking onto a Clock In signal in the range of at least about 125 to 50 MHz.

In one embodiment of the computer system 202, the system clock during the normal mode of operation is permitted to be within the range of about 100–150 MHz. Thus, where the system clock signal has a frequency falling within a lower portion of the 100–150 MHz range, such as 100–125 MHz, the PLL 904 will not be able to reliably lock on the Clock In signal when the computer system 200 enters the reduced power mode, reducing the Clock In signal to one-half of the system clock signal (i.e., within the range of about 62.5–50 MHz) if the PLL 904 is in the first mode of operation (i.e., capable of locking on a signal in the range of at least about 150–62.5 MHz). Conversely, where the system clock signal has a frequency falling within an upper portion of the 100–150 MHz range, such as about 125–150 MHz, the PLL 904 will not be able to reliably lock on the Clock In signal when the computer system is in the normal mode if the PLL 904 is in the second mode of operation (i.e., capable of locking on a signal in the range of 125–50 MHz).

However, the PLL 904 will be able to properly lock on the Clock In signal whether the computer system 200 is in normal or reduced power mode if the VCO_SELECT signal is properly configured. For example, with the system clock operating at a frequency of about 140 MHz, the Clock In signal will be at about 140 and 70 MHz during the normal and reduced power modes, respectively. If the VCO_SELECT signal has been asserted to set the PLL 904 in the first operating mode, then it will be capable of reliably locking on signals in the range of about 150–62.5 MHz, which includes the expected signals of 140 and 70 MHz. Similarly, if the system clock is operating in the lower portion of the frequency range, such as at 110 MHz, the Clock In signal will be at about 110 and 55 MHz during the normal and reduced power modes, respectively. If the VCO_SELECT signal has been deasserted to set the PLL 904 in the second operating mode, then it will be capable of reliably locking on signals in the range of about 125–50 MHz, which includes the expected signals of 110 and 55 MHz.

Accordingly, during initialization of the computer system 200, the CPU 204 detects the frequency of the system clock and sets VCO_SELECT signal accordingly. For example, if the CPU 204 detects that the system clock has a frequency falling in the lower portion (e.g., about 100–125 MHz) of the permitted frequency range, then the VCO_SELECT signal is asserted to cause the multiplexer 1006 to pass the output signal of the divide-by-two counter 1008. On the other hand, if the CPU 204 detects that the system clock has a frequency failing in the upper portion (e.g., about 125–150 MHz) of the permitted frequency range, then the VCO_SELECT signal is deasserted to cause the multiplexer 1006 to pass the output signal of the VCO 1004.

Figure 11:
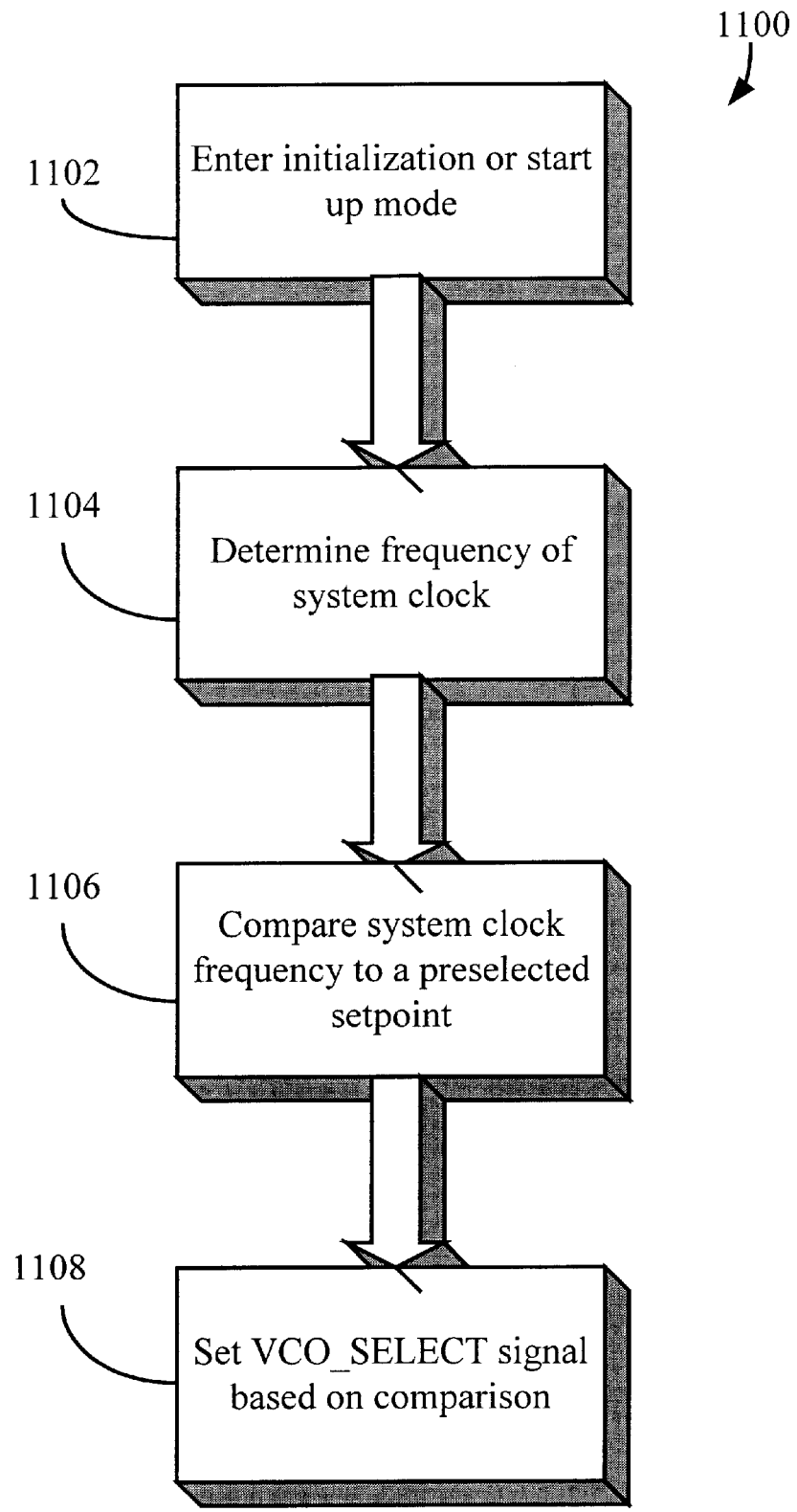
FIG. 11 illustrates a flow chart of a control sequence that may be executed by the CPU of FIGS. 2 and 9.

FIG. 11 illustrates one embodiment of a flowchart depiction of a software controlled process 1100 that may be operated by the CPU 204 during an initialization or startup mode. The software depicted in FIG. 11 is generally responsible for properly setting the value of the VCO_SELECT signal. The process 1100 begins at block 1102 with the computer system 200 entering the initialization or start up mode. This process generally occurs when the computer system 200 is powered on or reset, but ordinarily will not recur until the system is reset or powered down and then back on again.

In block 1104, the CPU 204 monitors the system clock signal to determine its frequency. Thereafter, in block 1106, the CPU 204 compares the frequency of the system clock signal to a preselected setpoint, which in the exemplary system described above is about 125 MHz. Finally, in block 1108, the CPU sets the VCO_SELECT signal to a first value in response to the frequency of the system clock signal being greater than about 125 MHz, and to a second value in response to the frequency of the system clock being less than about 125 Mhz.

The memory 212 includes additional methods and apparatus for reducing the likelihood that data stored therein will become corrupted or lost during transitions between the normal, reduced power, and idle modes of operation. For example, where the memory is composed of dynamic elements, such as in a synchronous dynamic random access memory (SDRAM), the elements must be periodically refreshed, or any charge originally placed thereon may bleed off. The process of periodically refreshing the memory elements may be delayed or otherwise interfered with by an unstable clock signal. Accordingly, during the transitions between the normal, reduced power, and idle modes of operation, the changing/unstable clock signal may cause the memory to become corrupted because of inadequate refreshing. Accordingly, a method and apparatus are provided that cause the memory 212 to enter a refresh mode that does not rely on the system clock signal during transitions between the normal, reduced power, and idle modes of operation.

In one embodiment, the memory 212 takes the form of an array of synchronous dynamic random access memory (SDRAM) devices such as are available from: Samsung as part numbers KM416S4030, KM416S9030, or KM415S16230/KM48S32230; Hitachi as part numbers HM5264165FTT or HM5225165BTT; or Mitsubishi as part numbers M2v6440BTP, M2v28s40ATP, or M2v56s40TP/M2v56s30TP. While four SDRAM devices are used in this embodiment, those skilled in the art will appreciate that more or fewer devices may be readily used without departing from the spirit and scope of the instant invention. The SDRAM devices are coupled together via a bus for transmitting at least data and address signals. Control signals, such as write enable (WE), column address select (CAS), row address select (RAS), chip select (CS), and the like, for effecting the operation of the SDRAM devices may also be transmitted over the bus or may be delivered via separate control signal lines. The control signals may be used to cause the SDRAM devices to enter various known modes of operation, such as self refresh. For example, the self refresh mode of operation may be entered by holding the CS, CAS, and RAS signals to a logically low level, while biasing the WE signal to a logically high level. In any event, once the established signaling protocol is recognized by the SDRAM devices they enter into a mode of operation that periodically refreshes the dynamic elements without reference to the system clock, but rather, relies on a clock signal generated internal to the SDRAM devices.

Generally, the self refresh mode of operation is normally used to retain data in the SDRAM devices, even if the rest of the computer system 200 is powered down. When in the self refresh mode, the SDRAM devices retain data without external clocking. Once the self refresh mode is requested, the clock signal input terminal to the SDRAM devices assume a "Don't Care" condition, and the SDRAM devices provide their own internal clocking. Thus, each SDRAM device performs its own refresh cycles. The SDRAM devices may remain in self refresh mode for an indefinite period of time without risk of losing or corrupting the data stored therein. However, once the clock signal has stabilized, the computer system 200 signals the SDRAM devices using a predefined signaling protocol, to emerge from the self refresh mode so that the SDRAM devices are again accessible.

Accordingly, it should be appreciated that causing the SDRAM devices to enter the self refresh mode temporarily during transitions in the frequency of the system clock signal effectively isolates the SDRAM devices from the system clock signal during these unstable periods. Thus, the contents of the SDRAM devices are protected from corruption that may otherwise be caused by the unstable system clock signal.

Returning now to FIG. 4, the timing diagram of relevant signals of the computer system 200 during a transition between the normal, reduced power, or idle modes of operation are illustrated. In particular, the timing of the SDRAM devices entering and exiting the self refresh mode is illustrated. As discussed in detail above in conjunction with FIG. 4, the general operation of the computer system 200 as it transitions between the normal, reduced power, or idle modes of operation involves requesting that each of the components 102 freezes its activity. Over a period of time, each of the components 102 responds with an acknowledge signal that it is now ready for the system clock signal to change frequencies. Thereafter, the frequency of the system clock signal is instructed to change. In one embodiment, the memory 212 is instructed to enter the self refresh mode at a time after all of the components 102 are ready for the frequency change, but before the frequency of the system clock signal is allowed to change. That is, the memory 212 enters the self refresh mode after all of the freeze acknowledge signals are received, but before the change signal is asserted.

Thereafter, the self refresh mode is permitted to persist until the Clock B signal has become stable and synchronized with the Clock A signal. In one embodiment, the memory 212 exits the self refresh mode after the freeze signal is deasserted. Those skilled in the art will appreciate that a memory controller (not shown) contained within the CPU 204 is responsible for delivering the signals that cause the memory 212 to enter the self refresh mode. Operation of the memory controller to initiate the self refresh mode may be accomplished under hardware or software control without departing from the spirit and scope of the instant invention.

The memory 212 of the computer system 200 operates in a modified manner in the idle mode of operation. As discussed above, the operation of the PLL 904 in the memory 212 is altered according to the system clock frequency to ensure that the PLL 904 is able to reliably lock onto the clock signal in both the normal and reduced power modes throughout the expected frequency range of the system clock signal. The operating range of the PLL 904, however, may not extend to the clock frequency used in the idle mode. Accordingly, where the operating range of the PLL 904 is insufficient to encompass the clock frequency used in the idle mode, a different technique is used.

Figure 10:
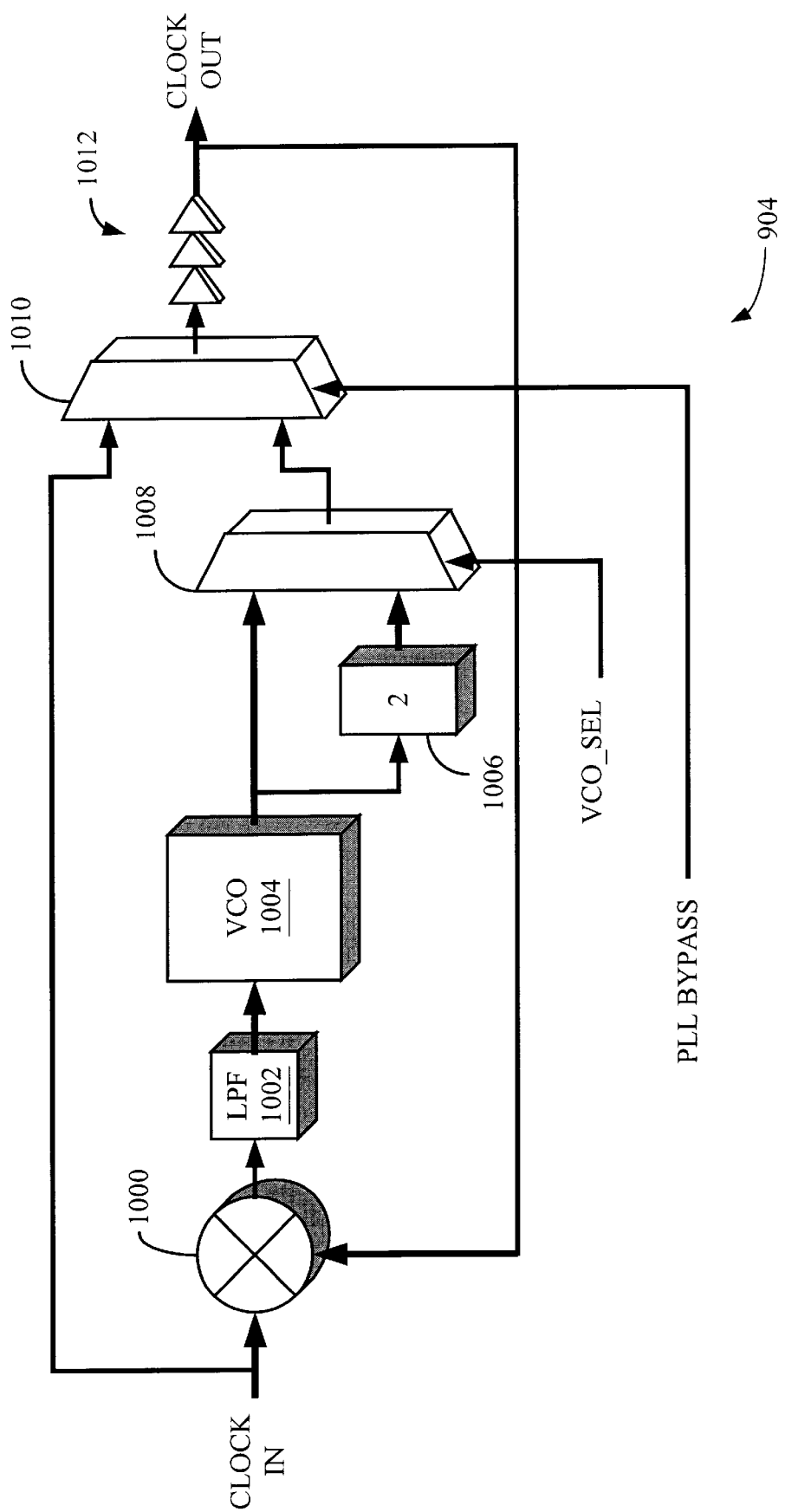
FIG. 10 illustrates a block diagram of a control circuit and PLL circuit of the memory of FIGS. 2 and 9.

First, the PLL 904 is bypassed. That is, as shown in FIG. 10, the multiplexer 1010 has a first input terminal coupled to receive the CLOCK IN signal and a second input terminal coupled to receive a locked clock signal, either directly or indirectly (i.e., through the divide-by-two counter 1008), from the VCO 1004. A PLL BYPASS signal is coupled to a control input terminal of the multiplexer 1010 so that one of the signals applied to the first and second input terminals may be selectively delivered to the clock tree 1012 and then distributed throughout the memory 212.

Thus, when the PLL BYPASS signal is not asserted, the multiplexer 1010 passes the clock signal from the VCO 1004. In this mode of operation, the PLL 904 is actively comparing the phase of the CLOCK IN signal with the phase of the CLOCK OUT signal to adjust the VCO 1004 to synchronize or lock the phases of the CLOCK IN and CLOCK OUT signals. In this mode, the PLL 904 operates as a zero delay buffer.

Alternatively, when the PLL BYPASS signal is asserted, the multiplexer 1010 passes the CLOCK IN signal to the clock tree 1012. In this mode of operation, the PLL 904 is effectively bypassed, with the CLOCK IN signal being substantially directly distributed by the clock tree 1012. Thus, since the PLL 904 is bypassed, the CLOCK OUT signal is no longer synchronized with the CLOCK IN signal. Rather, as shown in FIG. 12, the CLOCK OUT signal is delayed relative to the CLOCK IN signal by a time period D5 substantially corresponding to the delay introduced by the multiplexer 1010 and the clock tree 1012. In one embodiment, the time period D5 is in the range of about 6–8 nSec.

The time period D5 may be of sufficient duration that the transfer of data between the memory 212 and the other components 202, which are synchronized with the system clock signal, may be mistimed. Accordingly, a conventional memory controller 906, which may be located within the CPU 204, as shown in FIG. 9, employs a first and second mode of operation. The first mode of operation of the memory controller 906 is associated with the normal mode and the reduced power mode of operation. The second mode of operation of the memory controller 906 is associated with the idle mode of operation.

In the first mode of operation, the memory controller 906 is configured under either software or hardware control to control the timing of when address or data lines should be latched, driven, or sampled. That is, through empirical studies, theoretical calculations, or simulations, the memory controller 906 "knows" the amount of time that it needs to wait after a request to the memory 212 before the request will be serviced. For example, if the memory controller 906 requests that data be read from the memory 212, it "knows" that it must wait for a first preselected period of time before the memory 212 will deliver the data back to the memory controller 906. This first waiting period may be designed into a hardwired version of the memory controller 906, or may programmed via software executing on the CPU 204. Generally, a register (not shown) within the memory controller 906 has a value stored therein that identifies the desired timing to be employed by the memory controller 906. In one embodiment, the first period of time is in the range of one or more clock periods.

In the second mode of operation, the value stored in the register (not shown) is altered to cause the memory controller 906 to wait for a second, different period of time. In the illustrated embodiment, the second period of time is longer than the first to account for the time period D5 by which the CLOCK OUT signal is out of phase with the CLOCK IN signal. Thus, owing to the longer second period of time, the operation of the memory 212 is further slowed during the idle mode of operation, but the memory 212 remains active, and the data stored therein remains uncorrupted. The memory 212 is slowed, but remains operational even in the idle mode of operation with the CLOCK IN signal at about 1/32 of the normal clock frequency signal.

Returning now to FIG. 4, the timing diagram of relevant signals of the computer system 200 during a transition between the normal, reduced power, or idle modes of operation are illustrated. In particular, the timing of the PLL BYPASS signal is illustrated. Operation of the computer system 200 during a transition from the reduced power mode to the idle mode of operation may be appreciated by referring to FIGS. 4 and 9 simultaneously.

Assume that the BBC 216 has requested a change from the reduced power mode of operation to the idle mode of operation by setting the bits 300, 302 of the registers 220. The memory controller 906 recognizes, based on the bits 300, 302, that the system is entering the idle mode of operation, and therefore, needs to assert the PLL BYPASS signal while the SELF REFRESH signal is asserted. Asserting the PLL BYPASS signal when the SELF REFRESH signal is not asserted could result in data stored in the memory 212 being corrupted, as the CLOCK OUT signal may vary significantly when the PLL BYPASS signal is asserted. Accordingly, in the illustrated embodiment, the PLL BYPASS signal is asserted a preselected time period T2 after the CHANGE signal is asserted. Thereafter, as long as the computer system 200 remains in the idle mode of operation, the PLL BYPASS signal remain asserted.

At some point in time in the future, the BBC 216 will request that the computer system 200 move from the idle mode of operation to the reduced power mode of operation. Once the computer system 200 switches to the reduced power mode, the PLL 904 will again be capable of reliably locking on the CLOCK IN signal again. Thus, to increase the speed of the memory 212, the operation of the PLL 904 is restored to provide the zero delay clock signal. The PLL BYPASS signal is deasserted a preselected period of time T5 after the CHANGE signal is deasserted, which in the illustrated embodiment is after the CLOCK B/CLOCK IN signal transitions to the new higher frequency associated with the reduced power mode of operation.

Figure 13:
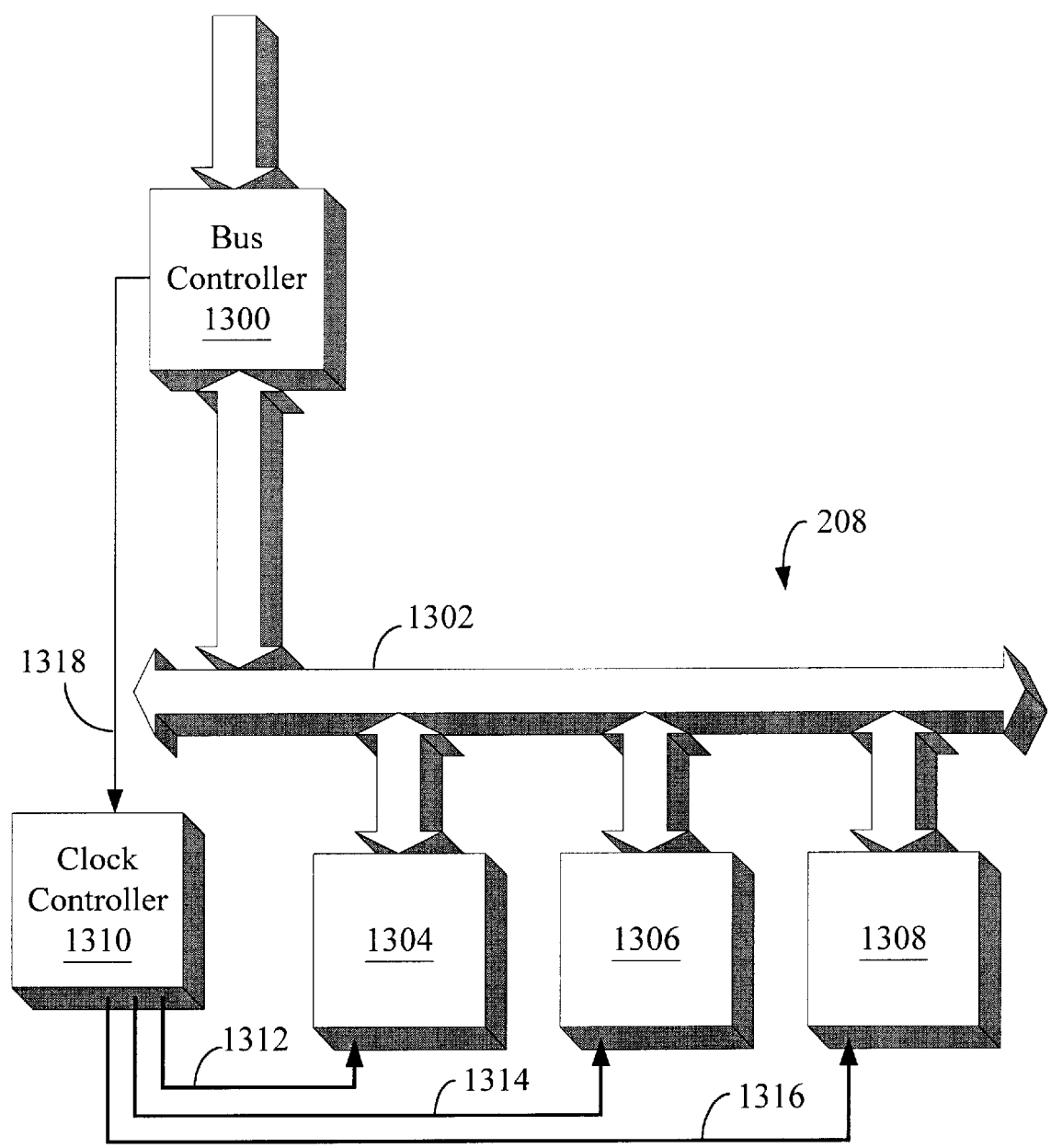
FIG. 13 illustrates a block diagram of a system bus and bus controller in the computer system of FIG. 2.

Turning now to FIG. 13, a bus controller 1300 for managing traffic to and from the peripherals 208 (see FIG. 2) is shown. The bus controller 1300 is coupled through a bus 1302, such as a product component interface (PCI) bus, to a plurality of conventional devices 1304, 1306, 1308, such as graphics cards, sound cards, and the like. While three devices are illustrated, more or fewer devices may be coupled to the bus 1302 without departing from the spirit and scope of the instant invention.

Each of the devices 1304, 1306, 1308 is configured to request access to the bus 1302 so that it may transfer data thereon or receive data thereover, such as from or to other components 202. A clock controller 1310 provides clock signals over lines 1312, 1314, 1316 to the devices 1304, 1306, 1308, respectively. The clock controller 1310 is also coupled to the bus controller 1300 to allow the bus controller to effect changes in the frequency of the clock signals delivered to the devices 1304, 1306, 1308 as a method of reducing the amount of power consumed by the computer system 200.

Generally, the bus controller 1300 is adapted to request that the clock controller 1310 provide either a slow or fast clock frequency signal to the devices 1304, 1306, 1308. When the devices 1304, 1306, 1308 are not providing data to or receiving data from the bus 1302, the frequency of the clock signal supplied thereto may be substantially reduced. However, when any of the devices 1304, 1306, 1308 desire to transfer data onto the bus 1302, or when another component desires to transfer data to one of the devices 1304, 1306, 1308, then the bus controller 1300 may instruct the clock controller 1310 to raise the frequency of the clock signal so that relatively high speed transfers to or from the devices 1304, 1306, 1308 over the bus 1302 may be accomplished. In this manner, the devices 1304, 1306, 1308 may be placed in a low power mode of operation when not in use. That is, all other things being equal, reducing the frequency of the clock signal supplied to the devices 1304, 1306, 1308 will reduce the power they consume. In one embodiment, the fast or normal clock signal has a frequency of about 33 MHz, and the slow or reduced frequency clock signal is divided by a factor of 32 to produce an approximately 1 MHz clock signal. Those skilled in the art will appreciate that a wide range of frequencies may be employed without departing from the spirit and scope of the instant invention.

Turning now to FIG. 14, a timing diagram of relevant signals of the computer system 200 during a transition between the fast and slow frequency clock signals is illustrated. In particular, the timing of a CLOCK signal, a REQUEST signal, a FAST/SLOW signal, and a GRANT signal are illustrated. Operation of the computer system 200 during a transition between the fast and slow frequency clock signals may be appreciated by referring to FIGS. 13 and 14 simultaneously.

As shown in FIG. 14, the CLOCK signal is shown to initially be operating at a relatively slow frequency, as shown in a region 1400. At some point in time, the REQUEST signal is asserted by either one of the devices 1304, 1306, 1308 or by one of the other components 202, as indicated by a positive transition 1402 in the REQUEST signal. The REQUEST signal may be delivered over the bus 1302 or via a separate line extending between the requesting device 1304, 1306, 1308. The bus controller 1300 responds to the asserted REQUEST signal by instructing the clock controller 1310 to increase the frequency of the CLOCK signal supplied to the devices 1304, 1306, 1308. The bus controller 1300 asserts the FAST/SLOW signal supplied to the clock controller 1310 over the line 1318, as illustrated by the positive transition 1404 in the FAST/SLOW signal.

The clock controller 1310 responds to the asserted FAST/SLOW signal by promptly increasing the frequency of the CLOCK signal, as shown in region 1406. After a preselected period of time has passed to allow the CLOCK signal to complete the transition and stabilize, the bus controller 1300 asserts the GRANT signal, as indicated by a positive transition 1408 in the GRANT signal, which is communicated to the device 1304, 1306, 1308 that asserted the REQUEST signal or is the target of the component 202 that asserted the REQUEST signal. In one embodiment, the GRANT signal is asserted two clock cycles after the FAST/SLOW signal is asserted. Thus, the devices 1304, 1306, 1308 may be quickly brought out of their low power/slow speed mode and restored to normal operation with minimal negative impact on the speed with which data may be transferred to or from the devices 1304, 1306, 1308.

Additionally, while there are no bus transactions pending, such that the bus controller 1300 is not asserting the FAST/SLOW signal, then the clock controller 1310 may control the clock frequency of the devices 1304, 1306, 1308 separately. That is, the clock controller 1310 may provide different frequency clock signals to the devices 1304, 1306,

1308. For example, a slightly higher frequency clock signal may be supplied to some of the devices 1304, 1306, 1308 to allow them to do some useful work. In one exemplary embodiment, the clock controller 1310 provides a 4 MHz clock signal to a network interface card (NIC) coupled to the bus 1302. The slightly higher clock signal allows the NIC to continue to process network packets while still saving power.

Eventually, the data transferred to or from the devices 1304, 1306, 1308 will be completed, causing the device 1304, 1306, 1308 requesting the transfer, or the component 202 requesting the transfer, to deassert the REQUEST signal. The bus controller 1300 responds to the deasserted REQUEST signal by desasserting the GRANT signal, preventing any further bus transactions until another REQUEST signal is asserted. At the same time or after the GRANT signal is deasserted, the bus controller 1300 also deasserts the FAST/SLOW signal, allowing the clock controller 1310 to reduce the frequency of the CLOCK signal, as shown in the region 1410.

This process is repeated for each transaction over the bus 1302. Thus, the frequency of the CLOCK signal remains at its reduced setting until data is transferred over the bus 1302. These periods of reduced frequency may occur often and for extended periods of time, resulting in a substantial reduction in the power consumed by the computer system 200.

Figure 15:
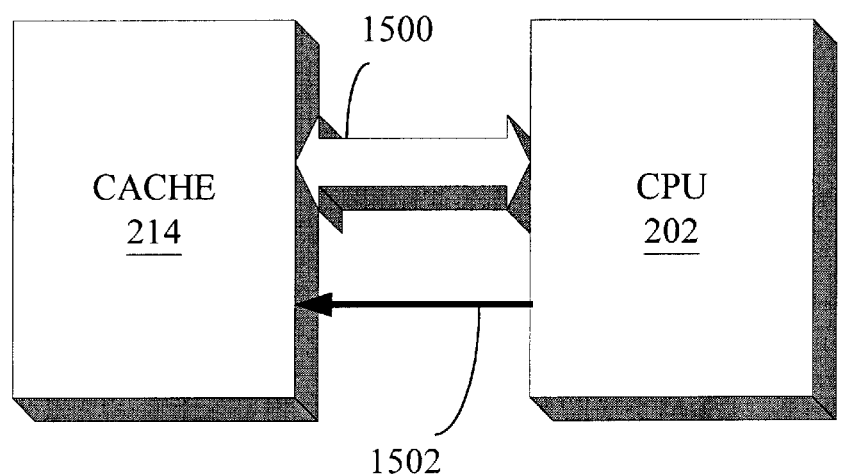
FIG. 15 illustrates a block diagram of an interface between a cache and a CPU of the computer system of FIG. 2.

Turning now to FIG. 15, a system for reducing power consumption based on reducing the power consumed by the cache 214 is illustrated. The cache 214 is coupled to the CPU 202 via a plurality of conventional connections, such as an address bus, a data bus, and various control signals, which are generally represented schematically by the two-ended arrow 1500. In addition to the connections represented by the two-ended arrow 1500, a control signal may be controllably delivered over a line 1502 by the CPU 202 to the cache 214 to cause the cache 214 to enter a power down mode of operation.

A variety of manufacturers of semiconductors produce memory products that may be used as a cache in a computer system. For example, IBM, Samsung, Sony, and the like each offer a semiconductor memory product specifically designed to operate as a cache in a computer system. At least some of these memory products, such as K7N803645M available from Samsung, include a mode of operation generally known as "sleep mode," and may be used as the cache 214 in the computer system 200.

Sleep mode is a low-current, power-down mode in which the cache 214 is deselected and current is reduced to a relatively low standby level. The cache 214 is induced to enter the sleep mode by asserting a signal at one of its input pins, which is commonly referred to as the ZZ input pin and is coupled to the control line 1502. After entering the sleep mode, all inputs to the cache 214, except ZZ, become disabled and all output signals from the cache 214 go to a high impedance state. During this sleep mode, the amount of current and/or power required by the cache 214 is substantially reduced.

Figure 16:
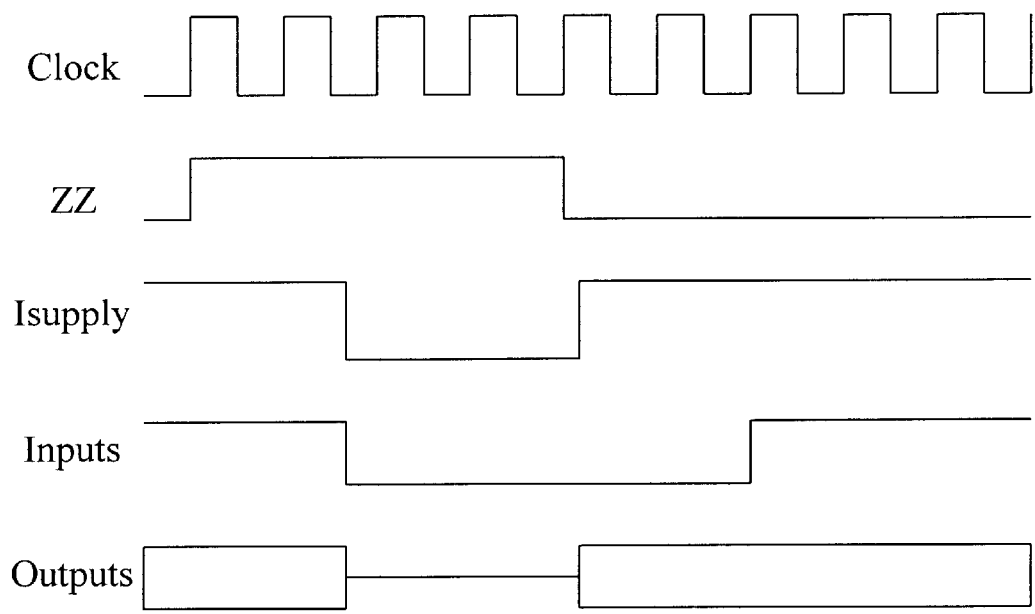
FIG. 16 illustrates a timing diagram of various signals used in coordinating the operation of the cache and CPU of FIGS. 2 and 15.

Operation of the cache 214 as it enters the sleep mode may be understood by reference to the timing diagrams set forth in FIG. 16. A clock signal 1600 is generally used to synchronize operations within the cache 214. The control signal delivered to the ZZ input pin, however, may be asserted asynchronously with respect to the clock signal 1600. Accordingly, at a preselected time a signal 1602, which is delivered to the cache 214 over the line 1502, is asserted. Two clock cycles after the control signal 1602 is asserted, the supply current, Isupply, to the cache 214 is substantially reduced, as illustrated by a current waveform 1604. At about the same time, as shown by the waveform 1606, all of the input pins to the cache 214 are disabled to prevent data stored in the cache 214 from being corrupted or lost by attempts to access the stored data during the sleep mode. All output terminals of the cache 214 are also driven to a high impedance state, as illustrated by the waveform 1608.

Thereafter, the cache 214 may be "awakened" from the sleep mode by deasserting the control signal 1602. When the control signal 1602 is returned to its deasserted state, the cache 214 returns the current supply, Isupply, to its normal level, and about two clock cycles thereafter, the input pins of the cache 214 are enabled again, as shown in the waveform 1606. The output pins of the cache 214 are also returned to their normal operating state. Thus, at two clock cycles after the control input 1602 is deasserted, the cache 214 is again running in its normal mode of operation.

Assertion of the ZZ control signal 1602 in the instant invention, unlike prior systems, occurs between memory references while the memory hierarchy is active. That is, in prior systems, the ZZ control signal 1602 is asserted only when the memory hierarchy is disabled, such as when a computer system was being placed in a standby or sleep mode, and thus no references to the memory hierarchy would be taking place. In contradistinction thereto, the system described herein may assert the ZZ control signal 1602 whenever the cache 214 is not currently handling a memory reference. That is, the computer system 200 may be operating in the normal, reduced power, or idle modes and be fully capable of making requests that will read from or write to memory, which may include the cache 214, memory 212, disk drives (not shown), and the like. When a memory request that involves the cache 214 is detected, the ZZ control signal is deasserted, and two clock cycles later, the cache 214 may service the memory request.

Figure 17:
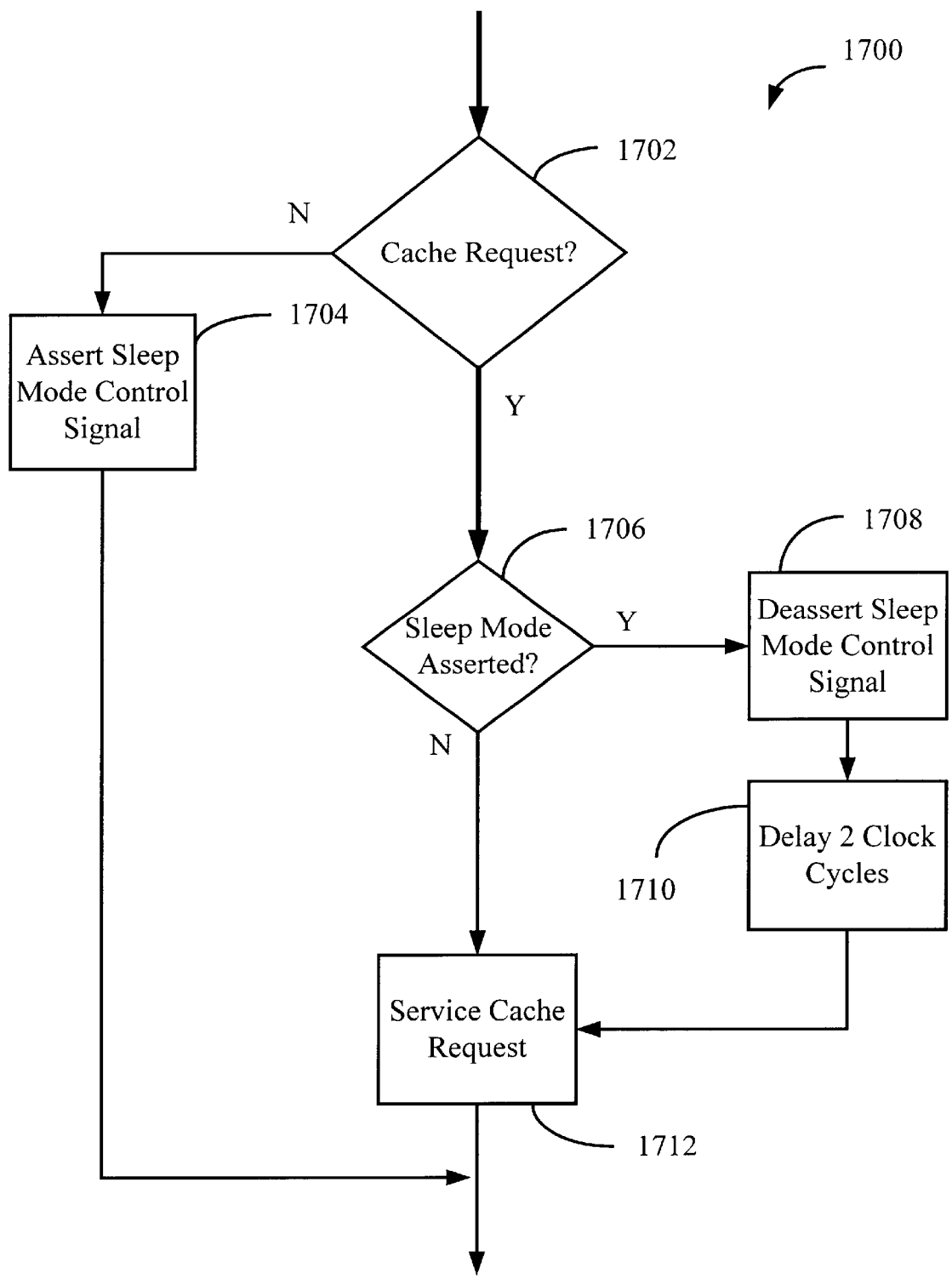
FIG. 17 illustrates a flow chart of a control sequence that may be executed by the CPU of FIGS. 2 and 15 to control operation of the cache.

Operation of the computer system 200 with respect to the sleep mode of the cache 214 may be understood by reference to the flowchart of FIG. 17. The flowchart of FIG. 17 represents the control flow or process 1700 of a program executed by the CPU 202 of the computer system 200, or of a hardware or firmware controller (not shown) that may be included in the computer system 200, such as within the CPU 202. Referring now to FIG. 17, the process 1700 process begins at block 1702 with the process checking to determine if a cache request has been received. Assuming that the cache 214 is not currently being requested, the process proceeds to block 1704 where the sleep mode control signal 1602 is asserted, causing the cache 214 to enter the sleep mode.

During a subsequent pass through the process 1700, assume that a cache request is received. Thus, at block 1702 control is transferred to block 1706 to determine if the cache 214 is currently in the sleep mode. Since the sleep mode control signal was asserted in block 1704 during a previous pass, control transfers to a block 1708 where the sleep mode control signal 1602 is deasserted, causing the cache 214 to awaken from the sleep mode. However, the cache 214 needs an adequate time period to complete the wake up sequence before the cache request can be serviced. Accordingly, at block 1710, a two clock cycle delay is inserted, and thereafter, at block 1712, the cache request is delivered to the cache 214 for servicing.

Assuming that an additional cache request is received during a subsequent pass through the process 1700, then block 1702 again passes control to block 1706, which recognizes that the cache 214 is not currently in the sleep mode, and thus, passes control to block 1712 where the cache request may be immediately serviced. During subsequent passes through the process 1700, if a cache request is not pending, the cache 214 may again be instructed to enter the sleep mode in block 1704. The process 1700 continually repeats so that the cache 214 may be put in the sleep mode between each cache request, or each group of cache requests.

Using the process and apparatus described above in conjunction with FIGS 15–17, power consumption of the computer system 200 may be reduced. This reduction in power consumption may be effective to further reduce power consumption in any of the operating modes described above. That is, the cache 214 may be instructed to enter the sleep mode between cache requests during the normal, reduced power, or idle modes of the computer system 200.

Figure 18:
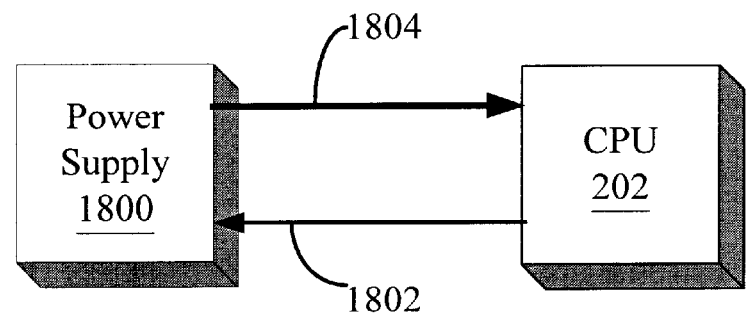
FIG. 18 illustrates a block diagram of an interface between a power supply and a CPU of the computer system of FIG. 2.

Turning now to FIG. 18, a system is provided in which a power supply 1800 is selectively controllable to provide varying levels of current or power. That is, the power supply 1800 may be selectively operated at a plurality of power levels, according to the operating characteristics of the computer system 200. For example, at times, the computer system 200 may be processing tasks that employ many of its resources, thus requiring substantial power. At other times, however, the computer system 200 may be idle or performing processing that utilizes few or no resources of the computer system 200, thus requiring substantially less power. A power supply without the features of the instant invention may continue to operate in the same mode, making the same amount of power available despite the fact that the computer system 200 may not require the amount of power currently being made available. This excess power results in the unnecessary consumption of power, attendant undesirable heating of the components of the computer system 200, and in the case of battery operated device, reduced useful life between rechargings of the battery.

In one embodiment of the instant invention, the power supply 1800 is adapted to receive a control signal over a line 1802 from, for example, the CPU 202 operating under software control. Those skilled in the art will appreciate that the control signal may alternatively be generated by a hardware controller (not shown) or a firmware controller that employs both hardware and software. Generally, the CPU 204 generates the control signal to cause the power supply 1802 to switch to one of a plurality of operating modes, where each of the operating modes causes the power supply to be capable of delivering a preselected level of power over a line 1804 to the CPU 202, for example. That is, when the CPU 202 identifies the computer system 200 as being in a mode of operation that requires a reduced level of power consumption, then the CPU 202 may deliver the control signal over the line 1802 to the power supply 1800 to cause the power supply 1800 to enter a mode of operation in which a diminished, but still satisfactory, level of power is available on the line 1804 from the power supply 1800.

In one embodiment, the power supply 1800 has three distinct operating modes capable of supplying three levels of power. Of course, the number of levels of power are a matter of design discretion, which will be a function of the parameters of each particular implementation. The number of levels of power may be varied from the illustrative embodiment described herein without departing from the spirit and scope of the instant invention.

Figure 19:
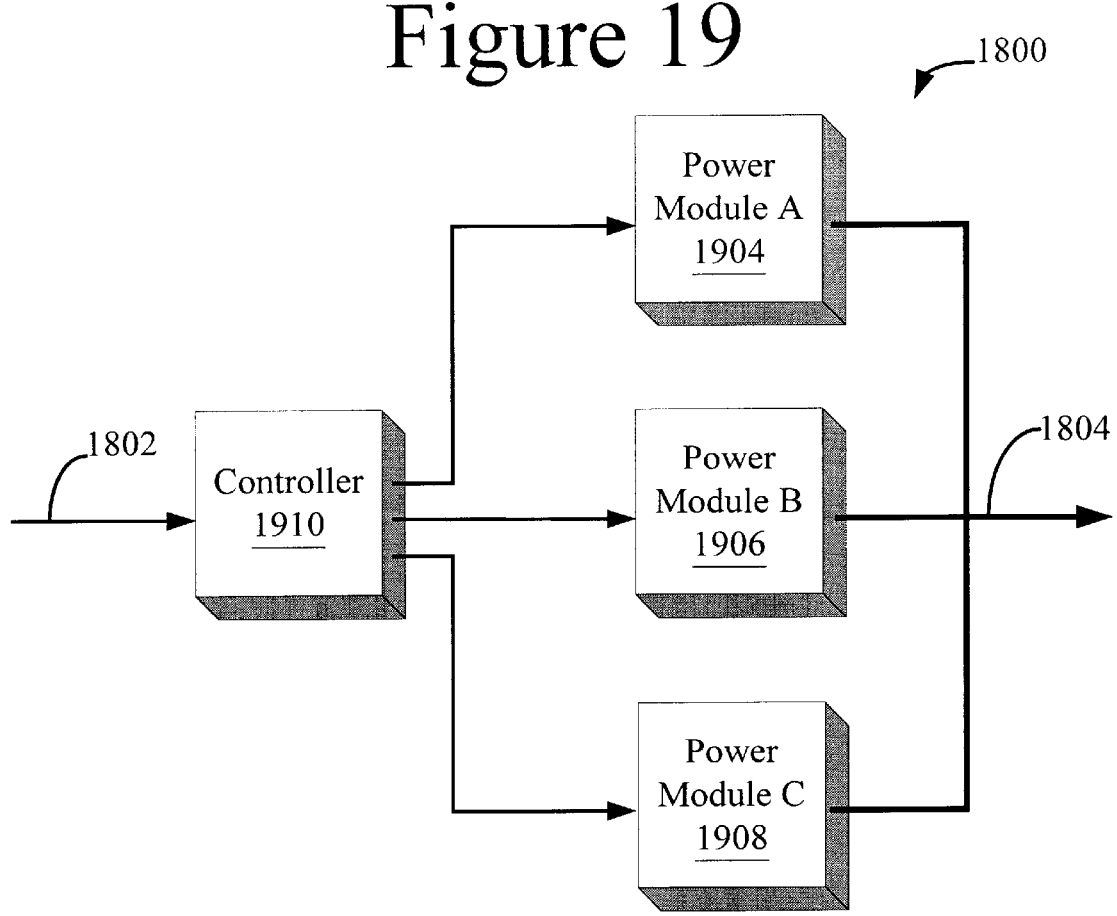
FIG. 19 illustrates a block diagram of the power supply of FIG. 18.

Turning now to FIG. 19, the power supply 1800 is shown to be comprised of a power module A 1904, power module B 1906, and power module C 1908 interfaced with a controller 1910. The power modules 1904, 1906, and 1908 have their output lines coupled to the line 1804 so that their power delivery capabilities add together. That is, assume that each of the power modules 1904, 1906, and 1908, are capable of providing 1 watt of power. Thus, with all three power modules 1904, 1906, and 1908 operating, the power supply 1800 is capable of delivering 3 watts of power. Similarly, when any two of the power modules, such as the power modules 1904, 1906, are operating, then the power supply 1800 is capable of delivering 2 watts of power. Likewise, when only one of the power modules, such as the power module 1904, is operating, then the power supply 1800 is capable of delivering 1 watt of power.

The controller 1910 selectively enables/disables the power modules 1904, 1906, and 1908 to enable the power supply 1800 to make available the level of power requested by the CPU 202. For example, if the CPU 202 detects that only 2 watts of power need be available from the power supply 1800, then the CPU 202 sends a request to the controller 1910 to make 2 watts of power available from the power supply 1800. The controller 1910 receives the request and disables one of the power modules, such as the power module 1906. Thus, the power modules 1904, 1906 are enabled to additively make available the requested 2 watts of power.

Figure 20:
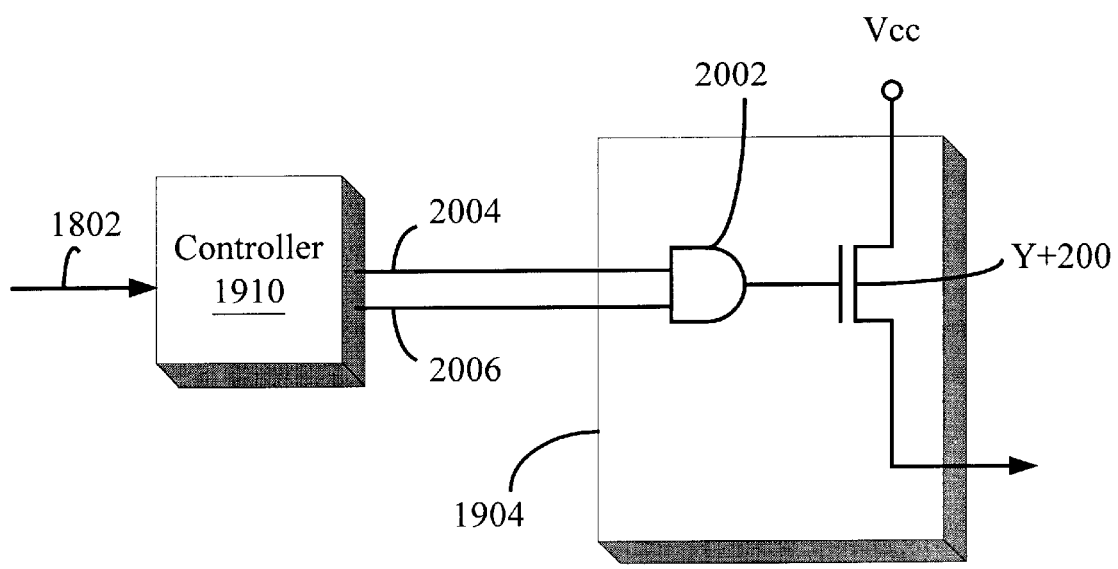
FIG. 20 illustrates a block diagram of a power module of the power supply of FIGS. 18 and 19.
Figure 21:
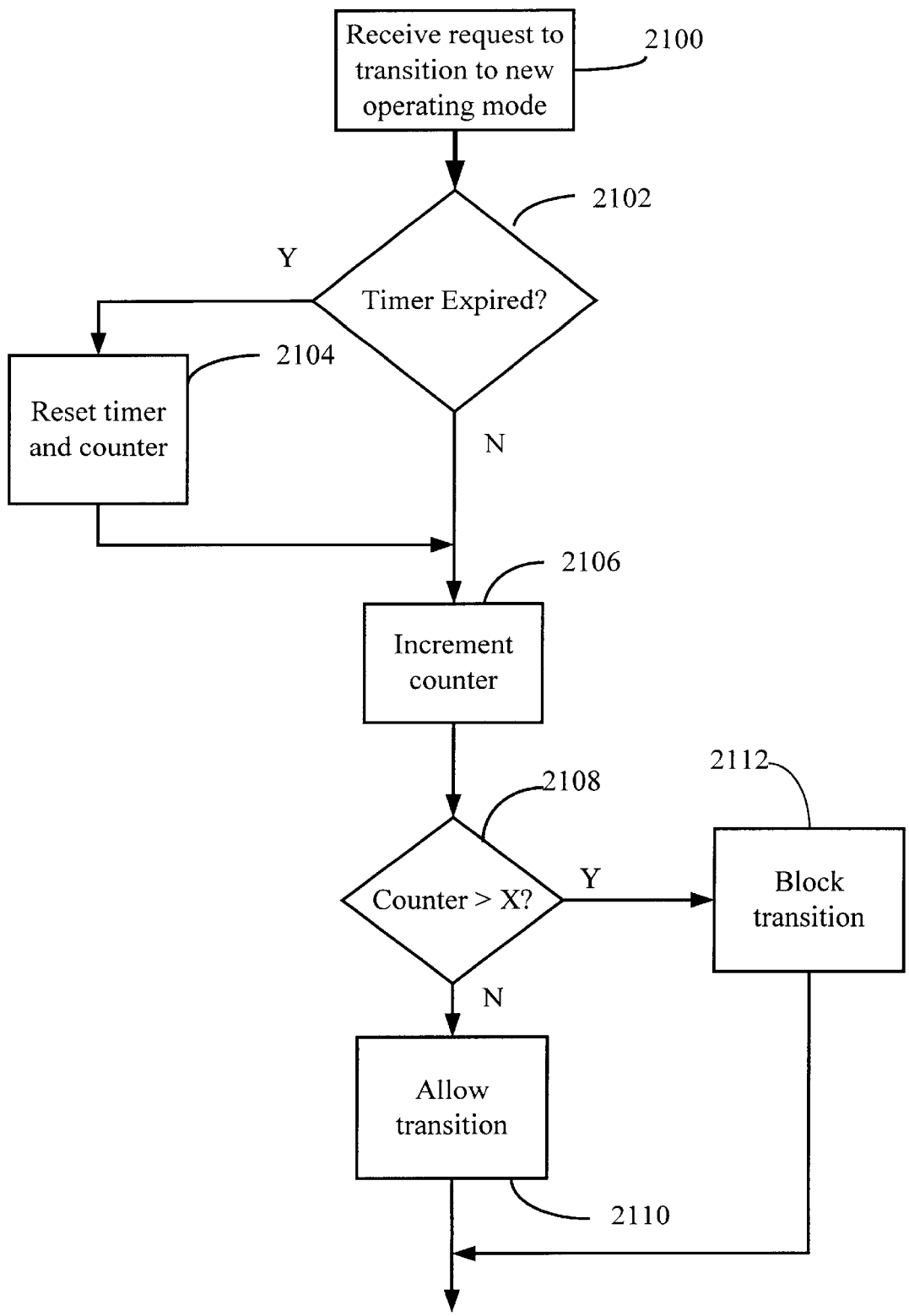
FIG. 21 illustrates a flow chart of a control sequence that may be executed by the CPU of FIG. 2 to reduce the effects of thermal cycling.

A stylized block diagram of circuitry useful in enabling/disabling the power modules 1904, 1906, and 1908 is stylistically shown in block diagram form in FIG. 20 with respect to the power module 1904. Those skilled in the art will appreciate that the construction and operation of enabling/disabling circuitry in the power modules 1904, 1906, and 1908 may be substantially similar, and thus, need not be repeated herein.

Generally, a power field effect transistor (FET) 2000 is disposed between a voltage supply Vcc and the line 1804. The on/off time of the FET 2000 is then controlled to produce the desired voltage and make available the desired current on the line 1804. A pulse width modulated (PWM) signal is delivered from the controller 1910 over a line 2004 to a gate of the power FET 2000. An AND gate 2002 and an enable signal delivered over a line 2006 are used to alternatively enable and disable the power module 1904 by selectively blocking the PWM signal from reaching the gate of the power FET 2000. With the PWM signal blocked, the power FET remains biased off, and no current or voltage is passed therethrough to the line 1804.

In one embodiment, the CPU 202 coordinates switching between the three power levels with transistions between the three operating modes. For example, during the normal mode of operation, the CPU 202 sends a request to the controller 1910 to make available the full power of the power supply 1800. Thus, the controller 1910 enables all three of the power modules 1904, 1906, and 1908. Similarly, during the reduced power mode of operation, the CPU 202 sends a request to the controller 1910 to make available only a portion of the power of the power supply 1800. Thus, the controller 1910 enables two of the power modules, such as the power modules 1904, 1906. Finally, during the idle mode of operation, the CPU 202 sends a request to the controller 1910 to further reduce the power of the power supply 1800. Thus, the controller 1910 enables only one of the power modules, such as the power modules 1904.

The CPU 202 will "know" the mode of operation based upon the contents of the register 220 and the status of the handshaking signals discussed above in conjunction with FIG. 4. Thus, the CPU 202 is capable of coordinating the timing of the transitions between the power levels of the power supply 1800.

In an alternative embodiment, the power levels need not be limited to three, and need not be associated with the operating modes of the computer system 200. Moreover, the power modules 1904, 1906, and 1908 need not be capable of providing the same level of power. For example, assume that the power modules 1904, 1906, and 1908 are capable of providing 2, 1, and 0.5 watts, respectively. By selectively enabling disabling the power modules 1904, 1906, and 1908, the power supply 1800 can produce seven levels of power, varying between 0.5 and 3.5 watts. These power levels can be produced by enabling/disabling the power modules 1904, 1906, and 1908 according to the patterns set forth in Table II below.

TABLE II

| Power Module 1905 | Power Module 1906 | Power Module 1908 | Power Level (watts) |
| --- | --- | --- | --- |
| Enable | Enable | Enable | 3.5 |
| Enable | Enable | Disable | 3.0 |
| Enable | Disable | Enable | 2.5 |
| Enable | Disable | Disable | 2.0 |
| Disable | Enable | Enable | 1.5 |
| Disable | Enable | Disable | 1.0 |
| Disable | Disable | Enable | .5 |

Those skilled in the art will appreciate that a variety of levels of power may be made available by varying the number of power modules and/or the power level produced by the modules. The number and magnitude of these-levels is a matter of design discretion, which will be a function of the parameters of each particular implementation. The number of levels of power and the magnitude of the variations therebetween may be varied from the illustrative embodiment described herein without departing from the spirit and scope of the instant invention.

As the computer system 200 moves between the normal, reduced power, and idle modes of operation, the amount of power consumed by the computer system 200 will vary substantially. These variations in power will also produce variations in the amount of heat generated by the computer system 200. Thus, the components 202 of the computer system 200 may undergo a substantial thermal cycle each time that the computer system switches between the modes of operation.

The components 202 are constructed from a variety of materials, which have varying coefficients of thermal expansion, and thus, respond differently to changes in temperature. That is, some of the materials expand substantially when heated, whereas others may be only minimally affected. In any event, some of the materials making up the components 202 will expand more, or at different rates, than others, creating relative movement therebetween. This relative movement of the materials making up the components 202 may impart substantial mechanical stress to the components 202. Repeated exposure to these stresses over time may physically damage the components 202, ultimately leading to reduced performance, or in the worst case, failure.

In some operating environments, the computer system 200 may undergo frequent, repeated variations in activity. Thus, the computer system 200 may be frequently requested to move between the normal, reduced power, and idle operating modes. These frequent changes may cause the computer system to repeatedly heat up and cool down. For example, during a period of relatively heavy activity, the computer system may move to the normal operating mode, operating at the full clock frequency. During this move to the normal mode of operation, the components 202 will produce more heat and expand accordingly. Thereafter, a period of reduced activity may induce the computer system 200 to enter the reduced power mode of operation, which consumes less power and produces less heat, allowing the components 202 to cool and causing the materials to shrink in size. If the relatively inactive period persists, the computer system 200 may be requested to enter the idle mode of operation, further cooling the components 202. Depending on the operating environment, these transitions may occur often over relatively long periods of time, producing repeated thermal cycles and attendant mechanical stress.

In one embodiment of the instant invention, thermal cycling is controlled to reduce the mechanical stress induced on the components 202. That is, the CPU 204, operating under software control, may limit the rate that the computer system 200 is allowed to transition between the normal, reduced power, and idle modes of operation. Controlling the rate at which the computer system 200 is allowed to transition between the various modes may be implemented in a variety of schemes.

For example, the computer system 200 may be required to remain in a particular operating mode for a preselected period of time. That is, once the computer system 200 moves to the normal mode of operation it may be required to stay in that mode for a preselected period of time, such as 30 minutes. A similar limit could be placed on moves from the reduced power mode of operation to the idle mode of operation. This control strategy may prove effective in reducing thermal cycling by controlling the transitions to prevent short duration temperature spikes. Moreover, holding the computer system 200 in a higher mode of operation may reduce the number of transitions. That is, if the computer system 200 is held in the normal mode of operation, instead of allowing it to cycle down to the reduced power or even idle modes of operation, then a subsequent period of increased activity will not require the computer system 200 to ramp back up to the normal operating mode.

In an alternative-embodiment, the computer system 200 may be limited to a preselected number of transitions within a preselected time period. For example, the computer system 200 may be limited to 20 transitions during a period of 24 hours. Thus, cyclical activity of the computer system 200 may cause relatively rapid transitions between the normal, reduced power, and idle modes of operation during a first portion of the preselected time period, but once the limit is reached, further transitions will not be permitted until the preselected time period expires.

In still another embodiment, the computer system 200 may "learn" activity patterns. That is, the computer system 200 may experience the same type of activity at about the same time each day. Thus, if the computer system 200 "knows" that during preselected time periods, such as 3–5 PM Monday through Friday, it will experience relatively heavy but cyclic use, then it may hold the computer system 200 longer in the normal mode of operation to reduce the number of cycles. Conversely, if the computer system 200 "knows" that it will experience extended periods of light use, such as during the evening and weekend hours, then the computer system 200 may be allowed to move into the idle mode of operation after relatively short periods of reduced activity. On the other hand, during periods of time when the computer system 200 historically sees moderate to heavy activity with only short durations of activity warranting movement to the idle mode of operation, then the computer system 200 may be held out of the idle mode of operation to reduce thermal cycling.

In one embodiment of the instant invention, the computer system 200, operating under software control, may record the type of requested transition, the time at which the transition was requested, and the duration that the computer system 200 remained in each mode of operation. This recording may go on continuously or at selected intervals. For example, the computer system 200 may track and record information of this type on an hourly, daily, weekly, monthly, etc. basis. The recorded information may be periodically analyzed to identify activity trends, such as periods of cyclic activity, periods of low activity, periods of extended high activity, etc. These identified trends may then be used to modify the rate at which the computer system 200 is allowed to transition between the normal, reduced power, and idle operating modes.

An exemplary flow chart of a process that may be executed on the CPU 204 to carry out one of the control schemes discussed above is illustrated in FIG. 21. The process begins at block 2100 with the BBC 216 requesting a transition between the operating modes. In block 2102, the process checks a timer to determine if a preselected duration of time has passed. If the timer indicates that the preslected time period has elapsed, then the timer and a software counter are reset in block 2104. In block 2106, the counter is incremented, which is used to keep track of the number of transitions that occur within the preselected time period defined by the timer. In block 2108, the process compares the counter value to a preselected number. If the counter value is less than the preselected number, control transfers to block 2110, where the transition is allowed to proceed. If, on the other hand, the counter value exceeds the preselected number, then the process proceeds to block 2112 where the requested transition is not allowed to proceed, causing the computer system 200 to remain in its current operating mode.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a–b") disclosed herein is to be understood as referring to the power set (the set of all subsets) of the respective range of values, in the sense of George Cantor. Accordingly, the protection sought herein is as set forth in the claims below.

What is claimed:

1. A computer system, comprising:
   a power management unit configured to change a power mode of operation of the computer system;
   a cache memory subsystem including a register which is updated to indicate the power mode of operation of the computer system, wherein the cache memory subsystem is configured to operate in a lower power mode in response to the register indicating that the computer system is in the lower power mode of operation; and
   a controller configured to monitor cache requests and configured to selectively assert a sleep mode control signal depending upon a receipt of one or more cache requests, wherein the cache memory subsystem is further configured to operate with reduced power in response to the assertion of the sleep mode control signal and independent of the power mode of operation of the computer system indicated by the register;
   wherein the sleep mode control signal is deasserted in response to receiving a cache request, and wherein the cache memory subsystem is further configured to operate in a normal mode in response to the deassertion of the sleep mode control signal and independent of the power mode of operation of the computer system indicated by the register.

2. The computer system of claim 1, wherein the sleep mode control signal is asserted in response to an absence of cache requests.

3. The computer system of claim 1, wherein the sleep mode control signal is asserted in response to the completion of a servicing of a cache request.

4. The computer system of claim 1, wherein the cache request is serviced a preselected period of time after the sleep mode control signal is deasserted.

5. The computer system of claim 4, wherein the cache request is serviced at least two clock cycles after the sleep mode control signal is deasserted.

6. The computer system of claim 1, wherein the cache memory subsystem is configured to operate in a normal mode in response to the register indicating that the computer system is in a normal power mode of operation.

7. A method comprising:
   changing a power mode of operation of a computer system;
   updating a register in a cache memory subsystem to indicate the power mode of operation of the computer system;
   operating the cache memory subsystem in a lower power mode in response to the register indicating that the computer system is in a lower power mode of operation;
   monitoring cache requests in the computer system;
   selectively asserting a sleep mode control signal depending upon a receipt of one or more cache requests;
   operating the cache memory subsystem with reduced power in response to the assertion of the sleep mode control signal and independent of the power mode of operation of the computer system indicated by the register;
   in response to receiving a cache request, deasserting the sleep mode control signal; and
   operating the cache memory subsystem in a normal mode in response to the deassertion of the sleep mode control signal and independent of the power mode of operation of the computer system indicated by the register.

8. The method of claim 7, wherein the sleep mode control signal is asserted in response to an absence of cache requests.

9. The method of claim 7, wherein the sleep mode control signal is asserted in response to the completion of a servicing of a cache request.

10. The method of claim 7, wherein the cache request is serviced a preselected period of time after the sleep mode control signal is deasserted.

11. The method of claim 10, wherein the cache request is serviced at least two clock cycles after the sleep mode control signal is deasserted.

12. The method of claim 7, wherein the cache memory subsystem is configured to operate in a normal mode in response to the register indicating that the computer system is in a normal power mode of operation.

* * * * *